United States Patent
Ghare et al.

(10) Patent No.: US 11,455,234 B2
(45) Date of Patent: Sep. 27, 2022

(54) ROBOTICS APPLICATION DEVELOPMENT ARCHITECTURE

(71) Applicant: Amazon Technologies, Inc., Seattle, WA (US)

(72) Inventors: Gaurav D. Ghare, Seattle, WA (US); Bin Zhu, Seattle, WA (US); Roger S. Barga, Kirkland, WA (US); William J. Vass, Bainbridge Island, WA (US); Gourav Roy, Seattle, WA (US); Chetan Banthiya, Bothell, WA (US); Paul Andrew Lafranchise, Seattle, WA (US); Dmitry Berkovich, Redmond, WA (US); Fusheng Yuan, Kenmore, WA (US); Ritesh Singh, Seattle, WA (US); Swarnaprakash Udayakumar, Seattle, WA (US); Brandon Kyle Pelfrey, Seattle, WA (US); Jason Chen Hooi Chionh, Seattle, WA (US); Iftach Ragoler, Sammamish, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/198,605

(22) Filed: Nov. 21, 2018

(65) Prior Publication Data
US 2020/0159648 A1    May 21, 2020

(51) Int. Cl.
*G06F 11/36* (2006.01)
*G06N 20/00* (2019.01)
(Continued)

(52) U.S. Cl.
CPC ............ *G06F 11/3664* (2013.01); *G06F 8/65* (2013.01); *G06F 11/3013* (2013.01);
(Continued)

(58) Field of Classification Search
USPC ......................................................... 717/135
See application file for complete search history.

(56) References Cited

U.S. PATENT DOCUMENTS

| 8,418,000 B1 * | 4/2013 | Salame ............... G06F 11/3684 714/38.1 |
| 9,110,496 B1 * | 8/2015 | Michelsen ................ G06F 1/00 |

(Continued)

FOREIGN PATENT DOCUMENTS

WO    2018194965 A1    10/2018

OTHER PUBLICATIONS

Balaji et al., "DeepRacer: Educational Autonomous Racing Platform for Experimentation with Sim2Real Reinforcement Learning," Nov. 5, 2019, retrieved Apr. 23, 2020, from https://arxiv.org/pdf/1911.01562.pdf, 9 pages.

(Continued)

*Primary Examiner* — Jason D Mitchell
(74) *Attorney, Agent, or Firm* — Davis Wright Tremaine LLP

(57) ABSTRACT

A robotic device management service obtains, from a customer, a first set of parameters of a robotic device and a second set of parameters for a simulation environment for testing a robotic device application installable on the robotic device. The set of parameters are used to indicate a storage location of the application and a selection of a simulation environment for testing the application. In response to the request, the robotic device management service selects a set of resources on which to execute the simulation in the simulation environment. The robotic device management service obtains the robotic device application from the storage location and loads the application on to the set of resources to execute the simulation.

20 Claims, 16 Drawing Sheets

(51) Int. Cl.
| | |
|---|---|
| *G06N 3/08* | (2006.01) |
| *G06F 8/65* | (2018.01) |
| *H04L 9/40* | (2022.01) |
| *G06F 11/34* | (2006.01) |
| *G06F 11/30* | (2006.01) |
| *G06F 9/451* | (2018.01) |
| *G06F 40/40* | (2020.01) |

(52) U.S. Cl.
CPC ........... *G06F 11/3457* (2013.01); *G06N 3/08* (2013.01); *G06N 20/00* (2019.01); *H04L 63/0823* (2013.01); *H04L 63/10* (2013.01); *G06F 9/451* (2018.02); *G06F 40/40* (2020.01)

(56) References Cited

U.S. PATENT DOCUMENTS

| | | | |
|---|---|---|---|
| 9,378,044 B1 | 6/2016 | Gaurav et al. | |
| 9,671,777 B1* | 6/2017 | Aichele | G05B 19/4069 |
| 10,058,995 B1* | 8/2018 | Sampedro | B25J 9/0084 |
| 10,090,791 B2 | 10/2018 | Saito et al. | |
| 10,445,653 B1* | 10/2019 | Veness | G06N 3/006 |
| 10,587,642 B1* | 3/2020 | Herman-Saffar | H04L 63/1416 |
| 10,786,900 B1* | 9/2020 | Bohez | B25J 9/163 |
| 2003/0090491 A1* | 5/2003 | Watanabe | B25J 9/1671 345/473 |
| 2004/0010603 A1* | 1/2004 | Foster | H04L 63/0823 709/229 |
| 2004/0189631 A1* | 9/2004 | Kazi | B25J 9/1671 345/418 |
| 2005/0049749 A1* | 3/2005 | Watanabe | B25J 9/1671 700/245 |
| 2005/0256606 A1* | 11/2005 | Irri | B21D 5/02 700/213 |
| 2006/0025890 A1* | 2/2006 | Nagatsuka | B25J 9/1666 700/253 |
| 2006/0080534 A1* | 4/2006 | Yeap | G06F 21/33 713/176 |
| 2010/0010949 A1* | 1/2010 | Ito | G06N 3/08 706/20 |
| 2011/0125894 A1 | 5/2011 | Anderson et al. | |
| 2012/0004893 A1* | 1/2012 | Vaidyanathan | G06K 9/62 703/11 |
| 2012/0054551 A1* | 3/2012 | Gao | G06F 11/3664 714/38.1 |
| 2013/0283266 A1 | 10/2013 | Baset et al. | |
| 2014/0165071 A1* | 6/2014 | Celis | G06F 9/5066 718/104 |
| 2014/0214394 A1* | 7/2014 | Inoue | G06F 17/5009 703/13 |
| 2014/0371905 A1* | 12/2014 | Eberst | B25J 9/1671 700/253 |
| 2015/0019191 A1* | 1/2015 | Maturana | G05B 17/02 703/13 |
| 2015/0019706 A1* | 1/2015 | Raghunathan | G06F 11/3414 709/224 |
| 2015/0055474 A1 | 2/2015 | Eyada | |
| 2015/0338162 A1* | 11/2015 | Hoffman | C10G 33/00 34/236 |
| 2016/0042292 A1* | 2/2016 | Caplan | G06N 20/00 706/12 |
| 2016/0306735 A1* | 10/2016 | Adderly | G06F 11/3664 |
| 2017/0195483 A1* | 7/2017 | Gault | H04M 7/0066 |
| 2017/0270717 A1* | 9/2017 | Somani | G06F 16/9024 |
| 2018/0088571 A1* | 3/2018 | Weinstein-Raun | G05D 1/0027 |
| 2018/0140203 A1* | 5/2018 | Wang | A61B 5/04017 |
| 2018/0189093 A1 | 7/2018 | Agarwal et al. | |
| 2018/0189101 A1* | 7/2018 | Xu | G06F 9/5088 |
| 2018/0293498 A1 | 10/2018 | Campos et al. | |
| 2018/0302340 A1 | 10/2018 | Alvarez Callau et al. | |
| 2018/0349482 A1* | 12/2018 | Oliner | H04L 41/22 |
| 2018/0373781 A1* | 12/2018 | Palrecha | G06F 17/10 |
| 2019/0025803 A1* | 1/2019 | Akitomi | G05B 13/0265 |
| 2019/0026634 A1* | 1/2019 | Homeyer | G06Q 10/103 |
| 2019/0176324 A1* | 6/2019 | Aukes | B25J 9/163 |
| 2019/0188117 A1* | 6/2019 | Liu | G06N 3/006 |
| 2019/0261860 A1* | 8/2019 | Culver | A61B 5/6803 |
| 2019/0272465 A1 | 9/2019 | Kimura et al. | |
| 2019/0278698 A1 | 9/2019 | Ahner et al. | |
| 2020/0065704 A1 | 2/2020 | Nag et al. | |
| 2020/0076857 A1* | 3/2020 | Van Seijen | G06N 20/00 |
| 2020/0090022 A1* | 3/2020 | Ma | G06K 9/00335 |
| 2020/0090056 A1* | 3/2020 | Singhal | G06N 5/04 |
| 2020/0150671 A1* | 5/2020 | Fan | G05D 1/0221 |
| 2020/0167686 A1* | 5/2020 | Mallya Kasaragod | G06F 30/20 |
| 2020/0167687 A1* | 5/2020 | Genc | G06N 20/00 |
| 2022/0048187 A1* | 2/2022 | Rudenko | B25J 9/163 |

OTHER PUBLICATIONS

Fan et al., "SURREAL: Open-Source Reinforcement Learning Framework and Robot Manipulation Benchmark," 2nd Conference on Robot Learning (CoRL '18), Oct. 29, 2018, 16 pages.

International Search Report and Written Opinion dated Mar. 30, 2020, in International Patent Application No. PCT/US2019/062508, filed Nov. 20, 2019.

Dosovitskiy et al., "CARLA: An Open Urban Driving Simulator," 1st Conference on Robot Learning (CoRL '17), Nov. 13, 2017, 16 pages.

International Search Report and Written Opinion dated Mar. 16, 2020, in International Patent Application No. PCT/US2019/062509, filed Nov. 20, 2019.

Liang et al., "RLlib: Abstractions for Distributed Reinforcement Learning," Proceedings of the 35th International Conference on Machine Learning (ICML '18), Jul. 10, 2018, 10 pages.

Roman et al., "Overseer: A Multi Robot Monitoring Infrastructure," In Proceedings of the 15th International Conference on Informatics in Control, Automation and Robotics, Jul. 2018, vol. 1, pp. 141-148.

Huang et al. "Modelling and designing a low-cost high-fidelity mobile crane simulator," Int. J. Human-Computer Studies 58 (2003), pp. 151-176.

Yan et al. "Building a ROS-Based Testbed for Realistic Multi-Robot Simulation: Taking the Exploration as an Example," Robotics 2017, 6(21):1-21.

Chen et al. "A Dynamic Resource Scheduling Method Based on Fuzzy Control Theory in Cloud Environment," Journal of Control Science and Engineering, vol. 2015, 10 pages.

Lauderdale et al., "A Feasibility Study for ISS and HTV Distributed Simulation," AIAA Modeling and Simulation Technologies Conference and Exhibit Aug. 11-14, 2003, 10 pages.

Aguero et al., "Inside the Virtual Robotics Challenge: Simulating Real-Time Robotic Disaster Response," IEEE Transactions on Automation Science and Engineering, 2015, 12(2):494-506.

Github, SurrealAI/symphony (kubernetes.md). [File] Github.com: committed on Oct. 13, 2018; Retrieved from «https://github.com/SurrealAI/symphony/blob/eOd6874f6b33f64e93773147ee51dbfe212aa07b/docs/kubernetes.md».

Github, SurrealAI/surreal (creation_settings.md). [File] Github.com: committed on Oct. 27, 2018; Retrieved from «https://github.com/SurrealAI/surreal/blob/86f991befa3884ca934acae6b7960279771120de/docs/creation_settings.md».

Kubernets, "How to migrate the pods automatically to another node in kubernets?" [Post] stackoverflow.com: submitted on Jul. 19, 2017; Retrieved from «https://stackoverflow.com/questions/45189137 1how-to-migrate-the-pods-automatically-to-another-node-in-kubernetes».

Garod, "The Curious Case of Failing Over in Kubernetes" [Post] Medium.com: posted on Oct. 27, 2018; Retrieved from «https://mgarod.medium.com/the-curious-case-of-failing-over-in-kubernetes-fcd16bc9a94d».

(56) References Cited

OTHER PUBLICATIONS

Github, openai/gym (frozen_lake.py). [File] Github.com: committed on Feb. 28, 2018; Retrieved from https://github.com/openai/gym/tree/4054fd50adfaf89ecc8cc973971a89a59eb62fc5».

Vilches et al., Whitepaper: "robot_gym: accelerated robot training through simulation in the cloud with ROS and Gazebo," arxiv.org; arXiv:1808.10369 [cs.RO]: submitted Aug. 30, 2018.

Fan et al., "SURREAL: Open-Source Reinforcement Learning Framework and Robot Manipulation Benchmark," 2nd Conference on Robot Learning (CoRL 2018): Zurich, Switzerland; published online Oct. 28, 2018; Retrieved from «https://github.com/mlresearch/v87/blob/gh-pages/fan18a/fan 18a.pdf».

* cited by examiner

| Services ▼ | Resource Groups ▼ | 🔧 | 🔔 N. Topeka ▼ | Support ▼ |

602

Robot | Robot > Reinforcement Learning > Create Model — 604

Reinforcement Learning

Leaderboards

Create Model

Model Details

Model Name:

[ Test ] — 606

Model Description - optional

[ Test RL model ] — 608, 610

Permissions and storage

The data object will be used to store your model and reward function. The policies will give the robot permission to perform actions in other services on your behalf, including your robot data object. These policies will grant permissions to the robot.

[ Create Policy and Data Object ] — 612

Environmental Simulation

The simulated environment emulates a track, and a virtual robot vehicle runs on it to train the model. You can start with a simple track and then move onto a more complex track to improve the model progressively.

Choose an option:

○ Loop — 616
This track benefits from rewarding your agent to turn in one direction and not the another.

— 614

Feedback | English U.S. | Privacy Policy | Terms of Use

ROBOTICS APPLICATION DEVELOPMENT ARCHITECTURE

CROSS REFERENCE TO RELATED APPLICATION

This application incorporates by reference for all purposes the full disclosures of co pending U.S. patent application Ser. No. 16/198,698, filed concurrently herewith, entitled "ROBOTICS APPLICATION SIMULATION MANAGEMENT".

BACKGROUND

Autonomous devices and other robotic devices have become ubiquitous in the day-to-day lives of many users in recent times. For instance, autonomous vehicles are becoming more popular among consumers and various companies have sought to create different autonomous vehicle platforms in the future. Robotic devices are also utilized in manufacturing to reduce costs and expedite the manufacturing process. However, developing the applications required by these autonomous devices and other robotic devices can be difficult and time consuming. For instance, testing and simulating a robotic device application can require significant resources and significant trial-and-error to ensure that the robotic device application will perform correctly when installed on to autonomous and other robotic devices.

BRIEF DESCRIPTION OF THE DRAWINGS

Various techniques will be described with reference to the drawings, in which:

FIG. 6 shows an illustrative example of an interface for creating the simulation for a robotic device using a robotic device application and the reinforcement learning model for optimizing the application in accordance with at least one embodiment;

DETAILED DESCRIPTION

Figure 1:
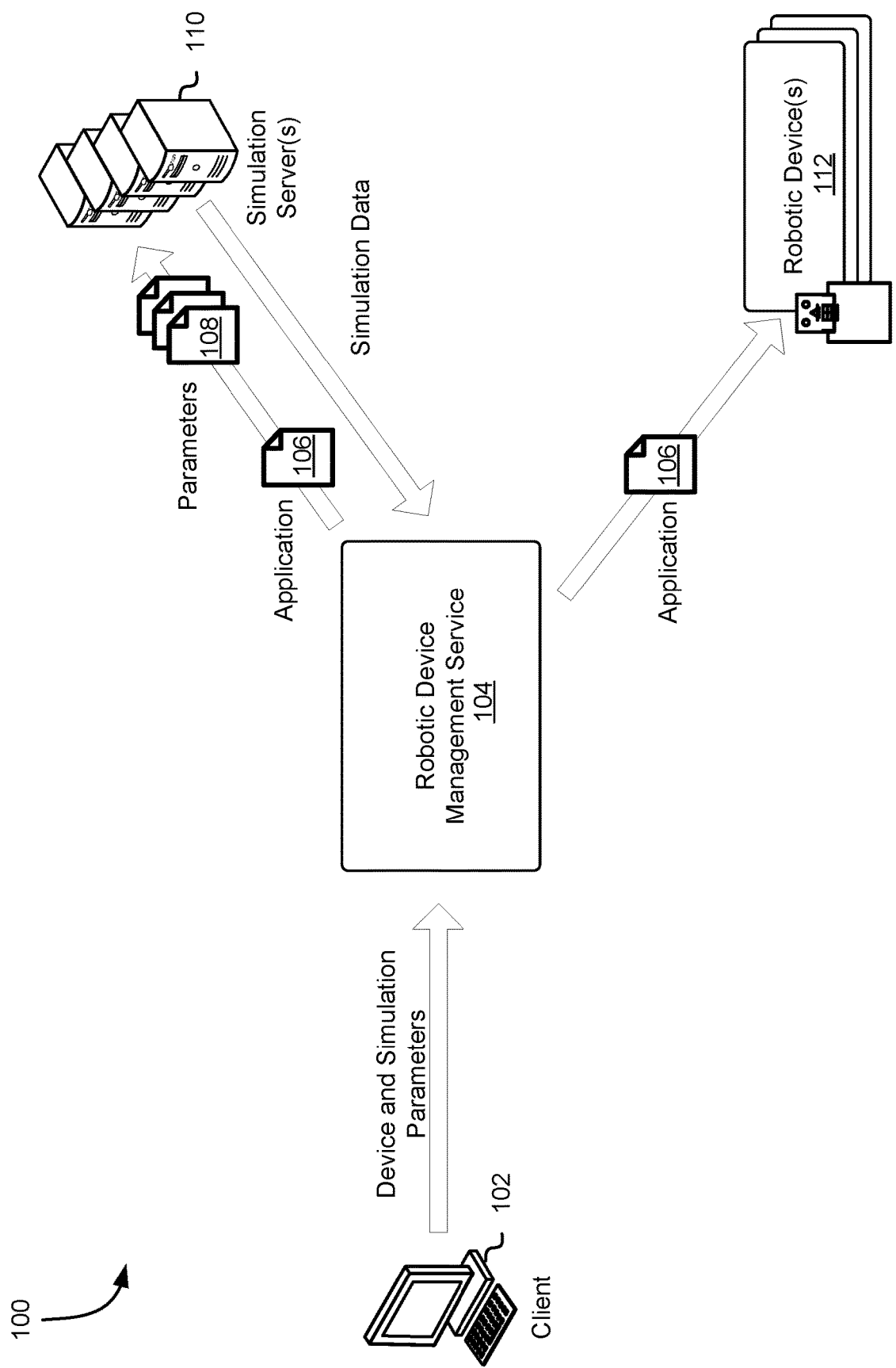
FIG. 1 shows an illustrative example of a system in which various embodiments can be implemented.

Techniques described and suggested herein relate to a development architecture for generating and simulating robotics device applications that are to be incorporated into various robotic devices. In an example, a customer of a robotic device management service submits a request to simulate execution of a particular robotic device application that can be installed on to a designated fleet of robotic devices. The customer may generate, through the robotic device management service, the robotic device application utilizing Robot Operating System (ROS) tools and libraries provided by the robotic device management service via an interface, such as a graphical user interface (GUI) exposed to the customer. The robotic device management service may store the robotic device application generated by the customer using the ROS tools and libraries in a data object provided by an object-based data storage service. In an example, the robotic device application can be deployed to a designated fleet of robotic devices in response to a request from the customer to make the application available to the fleet.

In one example, the customer can submit a request to the robotic device management service to simulate execution of a robotic device application stored in a data object provided by the object-based data storage service. The customer may provide, through the request, a set of robotic device parameters and a set of simulation environment parameters to define the simulation environment and the characteristics and capabilities of the robotic device within the simulation environment. For instance, the set of robotic device parameters may include the sensors installed on the robotic device, the movement capabilities and limitations of the robotic device, and the like. The simulation environment parameters may include the dimensions of a simulated room, identifiers and parameters of obstacles to be potentially encountered by the robotic device, the location of any obstacles to be potentially encountered by the robotic device, the location of any objects that the robotic device can interact with, the initial position of the robotic device, a desired position of the robotic device at the end of the simulation, and the like. Based on the obtained robotic device parameters and the simulation environment parameters, the robotic device management service may generate the simulation environment for testing of the application using a simulated robotic device.

In an example, the robotic device management service evaluates the provided parameters to determine the system requirements for performing the simulation of the application. For instance, the robotic device management service may determine the processes performed by each component of the simulation and, based on these processes, estimate the computational requirements of the component. Using this information, the robotic device management service may identify what resources are required to support the simulation. In an example, the robotic device management service provisions a set of virtual computing instances that collectively satisfy the system requirements for the simulation. Further, based on the specifications of each virtual computing instance, the robotic device management service may determine how to allocate the various components of the simulation among the virtual computing instances. The robotic device management service may provision the virtual computing instances for the various components and for execution of the simulation. Additionally, in an example, the robotic device management service configures a set of network interfaces among the virtual computing instances to enable communication between the various components of the robotic device during execution of the simulation.

In an example, the robotic device management service monitors execution of the application in the simulation environment to obtain simulation data that can be provided to the customer or used for other purposes. For instance, the simulation data may be used to update a reinforcement learning model for the robotic device, which can be used to update the application. If the robotic device management service detects failure of a virtual computing instance during execution of the simulation, the robotic device management service may identify the components of the robotic device that are impacted by this failure. Based on the performance requirements for these components, the robotic device management service may determine whether new virtual computing instances need to be provisioned to support these components or whether the components may be migrated to other virtual computing instances utilized for the simulation. If the robotic device management service determines that new virtual computing instances need to be provisioned, the robotic device management service may provision these new virtual computing instances and migrate the impacted components to these new virtual computing instances.

In an example, if the robotic device management service detects a surge in the simulation workload among a set of components, the robotic device management service can determine whether additional resources are needed to support the simulation of the application. If the robotic device management service determines that additional resources are needed, the robotic device management service may provision additional virtual computing instances to support the set of components impacted by the surge in the simulation workload. The robotic device management service may use the system requirements for this set of components to select the additional virtual computing instances. The robotic device management service may migrate the set of components impacted by the surge in the simulation workload to these additional virtual computing instances to ensure continued execution of the simulation.

In an example, the customer of the robotic device management service can define and manage a fleet of robotic devices that can install and execute the application. Based on identification of the robotic devices of a particular fleet, the robotic device management service may install an authentication application that can be used by the robotic devices to access the robotic device management service and provide data generated through execution of a customer-defined application. Further, through the authentication application, the customer may communicate with the robotic devices, and vice versa, through the robotic device management service. The authentication application may also be used to monitor execution of the customer-defined application to determine whether there any issues in the execution of the customer-defined application. In an example, through the GUI provided by the robotic device management service, the customer can define the robotic devices that are part of a fleet of robotic devices. Further, the customer may request installation of the customer-generated application on to the robotic devices of the fleet. In response to such a request, the robotic device management service may identify, based on the customer's grouping of robotic devices into a fleet, the robotic devices that are to receive the application for installation. The robotic device management service may transmit the application to these robotic devices to cause the robotic devices to install and execute the application. Further, the robotic device management service may establish a communication channel with each robotic device to enable the customer to interact with these robotic devices over the GUI provided by the robotic device management service.

In an example, the robotic device management service monitors performance of the fleet of robotic devices based on actions performed by the robotic devices and any data obtained from the robotic devices. If the robotic device management service detects an issue with the execution of the application, the robotic device management service may determine whether to roll back the application to an earlier version of the application. If an earlier version of the application is available, the robotic device management service may provide this earlier version of the application to cause the robotic devices of the fleet to roll back to this version of the application. Further, the robotic device management service may provide data corresponding to the issue to the customer to allow the customer to determine a course of action (e.g., modifying the simulation parameters and executing a new simulation of the application, modifying the computer-executable code for the application, etc.). If an update to the application is created, the robotic device management service may transmit the update to the robotic devices, which may incorporate the update into the application and resume execution of the application.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages. For example, because the robotic device management service provides ROS tools and libraries to customers of the service, these customers may utilize these resources to generate custom robotic device applications that may be made available for robotic devices. Additionally, the robotic device management service provides customers with resources to simulate execution of a custom application within a simulation environment. This obviates the need to install the application onto the robotic devices and test the application in a physical environment. Further, because simulation of the application may be performed, any trial and error may be performed within a virtual simulation environment while reducing the risk of damage to robotic devices when the application is installed on to the robotic devices. Further, because the robotic device management service allows customers to define fleets of robotic devices, the customer may simultaneously manage multiple robotic devices while implementing different application strategies to different fleets of robotic devices.

FIG. 1 shows an illustrative example of a system 100 in which various embodiments can be implemented. In the system 100, a customer of the robotic device management service 104, through a client device 102, submits a request to the robotic device management service 104 to create and simulate a robotic device application 106 that may be installed on a set of robotic devices 112 designated by the customer. The robotic device management service 104 may comprise a collection of computing resources that collectively operate to provide ROS tools and libraries to allow customers of the robotic device management service 104 to create custom applications that may be implemented on to a fleet of robotic devices 112. Further, the robotic device management service 104 may extend the ROS tools and libraries to other computing resource services. For example, through the robotic device management service 104, a customer may define a robotic device application 106 that leverages services that convert text into speech, which may be used to enable communication between the robotic devices 112 and the customer using natural language understanding (NLU). Additionally, the customer may define an application 106 that leverages a video streaming service of the computing resource service provider to enable real-time streaming of video captured by the robotic devices to the customer via the robotic device management service 104. Thus, the robotic device management service 104 may serve to coordinate interactions among the customer, robotic devices 112, and the myriad services made available by the computing resource service provider.

In an embodiment, the robotic device management service 104 provides a customer, through the client device 102, with an interface usable to create the robotic device application 106, specify the parameters for a simulation of the robotic device application 106, define and organize fleets of robotic devices 112, communicate with the robotic devices 112 over encrypted communications channels, and obtain data from the robotic devices 112 executing the robotic device application 106. Through this interface, the robotic device management service 104 may expose the various ROS tools and libraries that the customer may select to create the robotic device application 106. For instance, the robotic device management service 104 may provide, through the interface, a code editor that may be used by the customer to define the computer-executable code that comprises the robotic device application 106. Further, the robotic device management service 104 may provide, in addition to the code editor, graphical representations of modules corresponding to functionality made available through other computing resource services, such as those described above. The customer, through the interface, may select any of these modules to add these modules to the code editor in the form of computer-executable code.

The robotic device management service 104 may evaluate a robotic device application 106 created through the interface to identify any errors that may prevent proper execution of the application in a simulation environment and on the robotic devices 112. For instance, the robotic device management service 104 may evaluate the computer-executable code for any compilation errors, conflicting commands, undefined parameters or variables, and the like. Additionally, the robotic device management service 104 may provide suggestions for enhancing the computer-executable code. For example, if the customer has specified, through the computer-executable code, that data is to be obtained through a video stream of the robotic devices 112 executing the application 106, the robotic device management service may suggest implementing a module that leverages services that convert text into speech, whereby the text may be detected via the video stream.

In an embodiment, the customer, through the interface, can register a set of robotic devices 112 with the robotic device management service 104 to enable organization of these robotic devices 112 into logical groupings that may be maintained by the robotic device management service 104. Robotic devices 112 may include autonomous devices (e.g., "driverless" vehicles, appliances, unmanned aerial vehicles, space exploration vehicles, satellites, etc.) that may perform operations based on sensor data collected via analysis of a surrounding environment of the autonomous devices. It should be noted that robotic devices, as described throughout the disclosure, may refer to physical robotic devices and/or to simulated robotic devices, which may be a representation of the physical robotic devices but in a simulated environment. Through the interface, the customer may utilize various application programming interface (API) calls to register a new robotic device 112. For example, the customer may submit, through use of a RegisterDevice( ) API call, a unique name for the robotic device 112 that may be used to associate the robotic device 112 with the customer's account. In an embodiment, the RegisterDevice( ) API call is required for registration of the robotic device and the name of the robotic device, a unique Internet-of-Things (IoT) name of the robotic device, and the name of the logical grouping to which the robotic vehicle belongs are provided as a string. For instance, the customer may submit, through use of an RegisterDevice( ) API call, a unique IoT name for the robotic device 112, which may be used to establish the encrypted communications channel between the robotic device management service 104 and the robotic device 112. Additionally, through the RegisterDevice( ) API, the customer may define the logical grouping that the robotic device 112 is to be a part of. This logical grouping may be an existing grouping of robotic devices 112 previously created by the customer or a new logical grouping that the customer has defined. Optionally, the customer, through the RegisterDevice( ) API call, may define a client token that may be used to correlate requests and responses between the robotic device 112 and the robotic device management service 104, as described in greater detail below.

The customer, through use of a DeregisterDevice( ) API call, can submit a request to deregister an existing robotic device 112 from its account. In response to this API call, the robotic device management service 104 may update a database to update the registration status of the robotic device 112 and initiate a workflow to deregister the robotic device 112. In an embodiment, the DeregisterDevice( ) API call includes the unique name of the robotic device 112 that is to be deregistered as a string.

During this registration process, the robotic device management service 104 may require the customer to create a digital certificate for the robotic device 112 in order to allow for authentication of the robotic device 112 in communications with the robotic device management service 104 and any other services of the computing resource service provider. The customer may use a CreateDeviceCertificates( ) API call, specifying the IoT name for the robotic device 112, to request creation of the digital certificate for the robotic device 112. In response to the request, the robotic device management service may communicate with a network-connected device service to generate IoT information for the robotic device 112 and the digital certificate. Further, the robotic device management service 104 may transfer the digital certificate to the robotic device 112 to enable the robotic device 112 to present the digital certificate for authentication. In an embodiment, the robotic device management service 104 transmits a communications channel application to the robotic device 112 that, if installed and executed on the robotic device 112, enables the robotic device 112 to interact with the robotic device management service 104 and other computing resource services and to present the digital certificate for authentication.

In an embodiment, the customer submits a request to the robotic device management service 104 to initiate simulation of the robotic device application 106 within a simulation environment to perform a set of tests on the robotic device application 106. For instance, the customer may use the simulation of the robotic device application 106 to gauge the performance of a simulation of the robotic device 112 in the simulation environment. This may allow the customer to adjust the robotic device application 106 such that the robotic device 112 may achieve better results through execution of the robotic device application 106. In the request, the customer may specify a set of robotic device parameters and a set of simulation parameters, both of which may be used to generate a simulation environment and to perform the simulation of the robotic device application 106.

The robotic device parameters may include the names of the robotic devices 112 that are to be tested via the simulation environment. These parameters may further include the sensors to be utilized by the robotic devices 112, the movement capabilities and limitations of the robotic devices 112, and the like. The simulation environment parameters may include the dimensions of a simulated room, the location of any obstacles to be encountered by the robotic device, the location of any objects that the robotic device can interact with, the initial position of the robotic device, a desired position of the robotic device at the end of the simulation, and the like. In an embodiment, through the interface, the customer can define computer-executable code defining a custom-designed reinforcement function for training a reinforcement learning model for the robotic devices 112. For instance, the customer may specify, via an API call to the service 104 (e.g., StartEvaluation( ), etc.) to initiate simulation of a particular application 106, the resource name for the reinforcement function that is to be used in training a reinforcement learning model for the application 106, the resource name of the simulation environment to be used for the evaluation, the termination conditions for the simulation (e.g., timeout periods, model convergence requirements, etc.) and the location and name of the data object utilized for storage of data generated via the simulation. In an embodiment, the StartEvaluation( ) API call can include the resource name of the reinforcement learning model to be trained in the simulation, the resource name of the simulation environment selected for the simulation, the document or file that specifies the termination conditions for the simulation, and the data object to be used for storing artifacts of the simulation as a string. Optionally, through the StartEvaluation( ) API call, the customer can specify which token is to be used to correlate requests and responses.

In an embodiment, the customer can use an API call to the robotic device management service 104 (e.g., ImportModel ( )) to import a reinforcement learning model and the computer-executable code defining the custom-designed reinforcement function. The API call may include, as parameters, a unique name for the reinforcement learning model, the model type, the framework for the model, a description of the model, and the location of any model artifacts. In an embodiment, the aforementioned parameters are included with the ImportModel( ) API call in the form of a string. The customer may optionally specify which token is to be used to correlate requests and responses.

As noted above, the robotic device management service 104 may utilize reinforcement learning techniques to determine the actions a robotic device 112 is to perform based on simulation environment stimuli and the maximization of rewards in response to this stimuli. The customer may specify, through the interface, the particular goal to be achieved by the robotic device 112 in the simulation environment through execution of the application 106 and, through the computer-executable code defining the custom-designed reinforcement function, the rewards corresponding to the performance of actions in response to states within the simulation environment. Thus, a simulation agent may determine, within the simulation, an initial state of the robotic device 112 and the simulation environment. In response to the initial state of the robotic device 112 and of the simulation environment, the agent may select an action to be performed and cause the simulation of the robotic device 112 to perform the action. The resulting state of the robotic device 112 and the simulation environment is recorded and used to determine the reward value for the action based on the initial and ending states. Once the goal has been achieved, the agent may determine the total reward value and, using the custom-designed reinforcement function, determine whether the reward value is the maximum possible value. The agent may continue to perform simulations and adjusting the reinforcement learning model based on these reward values and the actions performed by the simulation of the robotic device 112.

It should be noted that reinforcement learning is used throughout the present disclosure for the purpose of illustration, other machine learning techniques, such as supervised learning techniques, may be utilized to optimize the robotic device application 106. For instance, a machine learning system may use training data about the application 106 to build a machine learning model that can be used in selecting strategies for the robotic device 112 in navigating through an environment to achieve a particular goal. In this example embodiment, the training data can be fed into a machine learning system and a classification algorithm to build a model that clusters actions and states into action strategy categories. In an embodiment using supervised learning, the input data can include indications of whether a strategy was correct for a given execution of the robotic device application 106. For example, a robotic device's analyzed behavior based at least in part on the selections made by the robotic device with regard to actions for navigating through a simulation environment to achieve a particular goal, and the like can be used to infer whether certain actions were correct for the robotic device 112, or the customer can identify correct actions in the data based on operational metrics after the performance of the actions. A machine learning system may, at any time, utilize one or more sample vectors to perform one or more simulations to determine whether the functions utilized by the application 106 to determine actions for a robotic device 112 are producing correct and accurate results and/or to refine the one or more functions utilized by the application 106 to produce correct and accurate results. For instance, during initialization of the machine learning system, the application 106 may provide the machine learning system with one or more sample vectors and analytical results (e.g., desired outcomes) that should be obtained based at least in part on these one or more sample vectors. The machine learning system, based at least in part on this exercise, may adjust the functions utilized by the application 106 to analyze the vectors corresponding to activity associated with actions performed by the robotic device 112 in the simulation environment.

The machine learning system may receive input from one or more analysts employed by the robotic device management service 104 to analyze the results from the one or more simulations of the application 106 through use of the one or more functions described above. For instance, an analyst may review the actions performed by the robotic device 112 in response to stimuli from the simulation environment and the one or more vectors generated by the robotic device management service 104 to determine whether the actions performed in response to the stimuli should be implemented. The analyst may provide his/her input for use in refining the model used to classify vector input as corresponding to any of the aforementioned strategies or to another strategy altogether. The vector of measurements corresponding to the review performed by the analyst and the desired outcome corresponding to the analyst's input may be used by the machine learning system to update the model used to classify vector inputs. Such may be performed by multiple analysts and/or using multiple vector inputs to provide the machine learning system a sufficient number of sample vector inputs and desired outputs. The machine learning system may adjust the one or more models used by the robotic device management service 104 to increase the likelihood that the desired result is obtained in future analyses.

In an embodiment, the robotic device management service 104 generates, based on the obtained parameters 108 (e.g., robotic device parameters and simulation environment parameters), the simulation environment to be used to test the application 106 and to train the reinforcement learning model for the application 106. For instance, the robotic device management service 104 may evaluate the obtained parameters 108 to determine the computational requirements (e.g., memory, central processing unit (CPU) requirements, graphics processing unit (GPU) requirements, etc.) for executing and supporting the simulation of the robotic device 112. For example, the robotic device management service 104 may identify a set of components of the simulation (e.g., physics engines, rendering engines, etc.) needed to execute the simulation and to process actions of the robotic device 112 within the simulation environment. Based on these computational requirements, the robotic device management service 104 may provision a set of virtual computing instances within a set of simulation servers 110 to execute the simulation of the application 106.

The simulation servers 110 may be made available via a virtual computer system management service. The virtual computer system management service, in an embodiment, comprises one or more computer systems that each include one or more processors and a memory containing instructions that, if executed by the one or more processors, process incoming requests from entities (e.g., the robotic device management service 104, etc.) and transmit commands to virtual computing system instances for execution of a set of commands, including execution of the simulation for the application 106 and of an application for training the reinforcement learning model utilized in the simulation to identify potential modifications to the application 106 to improve the efficiency and performance of the robotic device 112 executing the application 106. In an embodiment, the virtual computer system management service is implemented as a process, agent, or other executable code that, if executed, processes incoming requests from entities and transmits commands to virtual computing system instances for execution of the simulation. In an embodiment, the virtual computer system management service is implemented using other resources of a computing resource service provider (e.g., virtual computer system instances, other computing instances, etc.). In an embodiment, the robotic device management service 104 uses the virtual computer system management service to submit the application 106 and a set of parameters 108 that control how the simulation is to be generated and executed by the set of virtual computer system instances on the simulation servers 110.

Based on the computational requirements of each component of the simulation, the robotic device management service 104 may determine how to allocate the various components among the provisioned virtual computing instances on the simulation servers 110. For instance, the robotic device management service 104 may apply a more computationally intensive component within a virtual computing instance configured with high performance capabilities to handle complicated or resource-intensive applications. The robotic device management service 104 may place components of the simulation within a virtual computing instance within a simulation server 110 until a certain level of capacity usage has been reached. If a virtual computing instance is at capacity or has reached a limitation imposed by the robotic device management service 104, the robotic device management service 104 may allocate remaining components in other virtual computing instances based on the computational requirements of these components.

Since the components of the simulation may be allocated among any number of virtual computing instances across various simulation servers 110, the robotic device management service 104 may configure virtual network interfaces between the virtual computing instances to enable communication between the various components of the simulation during execution of the simulation. The virtual network interfaces may be implemented on the simulation servers 110 using hardware and software and may be executed using executable instructions whose execution by the simulation servers 110 cause the virtual network interface to perform the operations described herein. These virtual network interfaces may be utilized to transmit data among the various virtual computing instances and the components operating within. In an embodiment, the virtual computing instances provisioned for execution of the simulation are organized into a virtual private network of the customer. This allows the customer to access the simulation during execution to monitor performance of the robotic device in the simulation environment and to obtain data generated as a result of execution of the simulation. In an embodiment, if one or more of the components are located within a customer's on-premises network, the robotic device management service 104 may map the simulation to virtual computing instances within the customer's on-premises network. Thus, the virtual private network, in some instances, may include virtual computing instances on the simulation servers 110 and within the customer's on-premises network.

In an embodiment, the robotic device management service 104 monitors execution of the simulation to ensure that the simulation is completed successfully. For instance, if the robotic device management service 104 detects that a particular virtual computing instance has failed or is otherwise rendered inoperative, the robotic device management service 104 may determine whether any of the components of the simulation are impacted as a result of the failure. If the robotic device management service 104 determines that one or more components of the simulation are impacted due to the failure, the robotic device management service 104 may determine the performance requirements of the impacted components and, based on these performance requirements, determine whether any of the active virtual computing instances for the simulation can accommodate these components. If so, the robotic device management service 104 may migrate the impacted components to the active virtual computing instances and resume execution of the simulation. Alternatively, if the active virtual computing instances do not have the capacity to accommodate these impacted components, the robotic device management service 104 may submit a request to the virtual computer system management service to provision new virtual computing instances on to the simulation servers 110. The robotic device management service 104 may migrate the impacted components on to these new virtual computing instances and resume simulation of the robotic device 112 within the simulation environment.

Similarly, the robotic device management service 104 may monitor the simulation and the virtual computing instances to determine whether there is a surge in the simulation workload of the simulation. If the robotic device management service 104 detects a surge in the simulation workload, the robotic device management service 104 may determine whether this surge in the simulation workload is an indication that additional virtual computing instances are needed to support the simulation of the robotic device 112. If additional virtual computing instances are needed, the robotic device management service 104 may submit a request to the virtual computer system management service to provision new virtual computing instances on to the simulation servers 110. The performance requirements for these virtual computing instances may be determined based on the performance requirements of the components responsible for the surge in the simulation workload and/or selected for migration in response to the surge in the simulation workload. The robotic device management service 104 may migrate the identified components to these newly provisioned virtual computing instances and continue simulation of the robotic device 112.

In an embodiment, the robotic device management service 104 stores data generated via execution of the simulation of the robotic device 112 in a data object maintained by an object-based data storage service. The object-based data storage service may be a service provided by a computing resource service provider. The object-based data storage service may be implemented on a computer system, or abstraction thereof (such as one or more virtual machines operating via a hypervisor), implemented using hardware and software, and may comprise one or more processors and memory that stores executable instructions whose execution by the one or more processors causes the computer system to perform operations described herein. The data stored in the object-based data storage service may be organized into data objects. The data objects may have arbitrary sizes and may, in some instances, have constraints on size. Thus, the object-based data storage service may store numerous data objects of varying sizes. The object-based data storage service may operate as a key value store that associates data objects with identifiers of the data objects which may be used by the customer or other entity (e.g., the robotic device management service 104, etc.) to retrieve or perform other operations in connection with the data objects stored by the object-based data storage service. Access to the object-based data storage service may be through API calls to the service or via an interface, such as a GUI.

The simulation data obtained by the robotic device management service 104 through simulation of the robotic device 112 may include the updated reinforcement learning model generated through simulation of the robotic device 112 using the application 106 and the custom-designed reinforcement function provided by the customer. Further, the simulation data may specify the actions performed by the robotic device 112 in the simulation based on the various simulation environment stimuli processed by the robotic device 112 through execution of the application 106. The robotic device management service 104 may provide this simulation data to the customer to fulfill its request to perform the simulation of the robotic device 112 using the identified application 106 and the set of parameters 108 provided by the customer via the client 102. In some instances, the robotic device management service 104 may provide a Uniform Resource Identifier (URI) or other network address of the data object used to store the simulation data. The customer may use the URI or other network address to access the data object and retrieve the simulation data. In an embodiment, the application 106 is similarly stored in a data object of the object-based data storage service, as well as any dependencies (e.g., other assets required for execution of the simulation such as environment obstacle definitions, robotic device limitations, etc.).

In an embodiment, the customer, through the interface provided by the robotic device management service 104, can submit a request to install the application 106 on to a set of robotic devices 112. As noted above, the customer may create logical groupings of robotic devices 112 through the interface provided by the robotic device management service 104. Thus, the customer may select, through the interface, one or more of the logical groupings to indicate which robotic devices 112 are to obtain and execute the application 106. In response to the request, the robotic device management service 104 may obtain the application 106 from the data object used to store the application 106 and transmit the application 106 to the selected robotic devices 112. The robotic device management service 104 may transmit the application 106 from this data object to each of the identified robotic devices 112 of the customer's selected logical grouping. In an embodiment, rather than transmitting the application 106 to the robotic devices 112 specified by the customer, the robotic device management service 104 transmits, to each robotic device 112, the network address of the data object or other datastore utilized to store the application 106. This may cause each robotic device 112 to utilize the provided network address to access the data object or other datastore used to store the application 106 and obtain, from the data object or other datastore, the application 106 for installation and execution on the robotic device 112.

To request installation of the application 106 on to the set of robotic devices 112, the customer may submit a DeployProjectToDevice( ) API call to the robotic device management service 104. In an embodiment, the DeployProjectToDevice( ) API is required to start deploying a specified application 106 to a robotic device 112 in the customer's account and can include, as a string, the name of the robotic device 112 and the unique name of the application 106. Actual deployment of the application 106 to a set of robotic devices 112 may be performed asynchronously. In response to the request to deploy the application, the service 104 may provide the customer with a unique deployment identifier. The customer may monitor the deployment of the application 106 to the robotic devices 112 through a GetDeploymentStatus( ) API call to the robotic device management service 104. The customer may include, as a string, the deployment identifier previously provided by the robotic device management service 104. In response to this request, the robotic device management service 104 may provide detailed information about the status of the deployment of the application 106 to the robotic devices 112.

If the customer wants to remove the application 106 from a robotic device 112, the customer may submit a DeleteProject( ) API call, through which the customer may specify the name of the application 106 to be removed as a string. In response to the DeleteProject( ) API call, the robotic device management service 104 may remove the application 106 from the customer's account and cause the robotic devices 112 of the fleet to delete the application 106 if installed on to the robotic devices 112. To remove the application 106 from a specific robotic device 112, the customer may submit a RemoveProjectFromDevice( ) API call to the service 104. In an embodiment, the RemoveProjectFromDevice( ) API call is required to remove the application 106 from the specified robotic device 112 and can include, as a string, the name of the robotic device 112. The robotic device management service 104 may transmit a request to the designated robotic vehicle 112 to remove the application 106 from its system.

For each robotic device 112, the robotic device management service 104 may establish a communications channel between the robotic device 112 and the robotic device management service 104 to enable communications between the robotic device 112 and the robotic device management service 104. For instance, the robotic device 112 may transmit a request, over this communications channel, to the robotic device management service 104 to access a set of resources provided by the service 104 or by other computing resource services. Through the communications channel, the robotic device 112 may further provide data usable by the customer to visualize the environment that the robotic device 112 is interacting with. For instance, if the robotic device 112 includes a video recording device, the robotic device 112 may use the video recording device to stream video over the communications channel to the robotic device management service 104. The customer, through the interface provided by the robotic device management service 104, may access the video stream to watch the robotic device 112 in its environment. Through the communications channel, the customer may interact with the robotic device 112 and issue commands to the robotic device 112 as needed through the interface. Thus, the customer may cause the robotic device 112 to deviate from the actions encoded into the application 106 during execution of the application 106 based on data utilized by the customer to visualize the environment of the robotic device 112.

In an embodiment, the robotic device management service 104 may monitor performance of each robotic device 112 of the selected logical groupings based on actions performed by each robotic device 112 during execution of the application 106. For instance, the robotic device management service 104 may determine, based on data obtained from a robotic device 112, that an issue exists with the application 106 being executed by the robotic device 112. For example, if the robotic device 112 performs an unexpected action as a result of execution of the application 106, the robotic device management service 104 may determine that an issue with the application 106 is present. Similarly, the robotic device management service 104 may detect an issue with the application 106 in the event that the application 106 prematurely terminates or otherwise crashes. In an embodiment, if the robotic device management service 104 determines that there is an issue with the application 106 being executed on a robotic device 112, the robotic device management service 104 can provide an earlier version of the application 106 to the robotic device 112 for installation and execution. The robotic device management service 104 may maintain, in a data object, earlier versions of the application 106 in the event that the latest version of the application 106, updated based on simulations performed using the application 106, is found to have issues impacting performance of the robotic devices 112. Thus, the robotic device management service 104 may allow the robotic devices 112 to execute the earlier version of the application 106 while simultaneously performing additional simulations using the application 106 to address any identified issues.

In an embodiment, if an update to the application 106 is available, the robotic device management service 104 can transmit the update to the application 106 to the robotic devices 112 utilizing the application 106 over the established communications channels. Alternatively, the robotic device management service 104 may transmit, to each robotic device 112, the network address of a data object or other datastore that stores the update to the application 106. This may cause each robotic device 112 to utilize the provided network address to access the data object or other datastore to obtain the update. In response to obtaining the update, a robotic device 112 may implement the update and resume execution of the application 106. In an embodiment, the update is provided using over-the-air (OTA) programming through encrypted communications channels, such as the aforementioned communications channels established between the robotic devices 112 and the robotic device management service 104.

Figure 2:
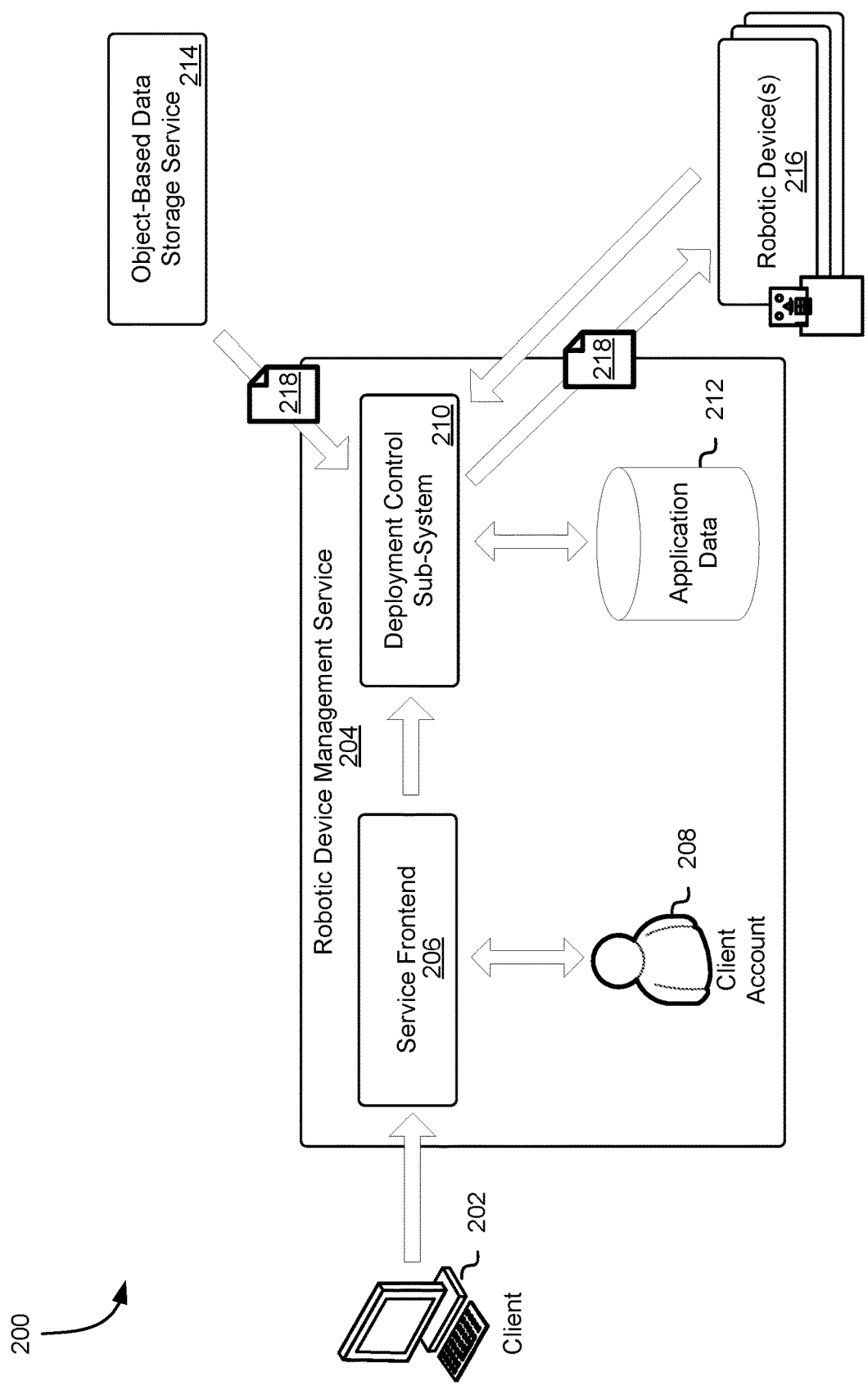
FIG. 2 shows an illustrative example of a system in which a deployment control sub-system of a robotic device management service transmits a robotic device application to a fleet of robotic devices and obtains data from the fleet of robotic devices in accordance with at least one embodiment.

FIG. 2 shows an illustrative example of a system 200 in which a deployment control sub-system 210 of a robotic device management service transmits a robotic device application 218 to a fleet of robotic devices 216 and obtains data from the fleet of robotic devices 216 in accordance with at least one embodiment. In the system 200, a customer of the robotic device management service 204, via a client device 202, submits a request to a service frontend 206 of the robotic device management service 204 to deploy an application 218 to a fleet of robotic devices 216 for execution of the application 218 on these robotic devices 216. The service frontend 206 is implemented on a computer system or abstraction thereof (such as one or more virtual machines operating via a hypervisor), implemented using hardware and software, and can comprise one or more processors and memory that stores executable instructions whose execution by the one or more processors causes the computer system to perform operations described herein. In an embodiment, the service frontend 206 makes available, to the client device 102, an interface through which a customer may define requests to the robotic device management service 104. For example, through the interface, the customer may select the application 218 to be installed on to the fleet of robotic devices 216, an identifier corresponding to the logical grouping that includes the fleet of robotic devices 216, and other parameters (e.g., storage location for data generated by the robotic devices 216 as a result of execution of the application 218, sensors and other devices to be activated on the robotic devices 218, communications capabilities for the robotic devices 216, parameters for overriding actions of the robotic devices 216, etc.).

In response to the request, the service frontend 206 may determine whether the customer is authorized to have the selected robotic device application 218 implemented on the identified robotic devices 216. For instance, the service frontend 206 may access a client account 208 associated with the customer to identify a set of access control policies that define a level of access to the robotic device management service 204 and any permissions that define the actions the customer may or may not perform. Based on these policies, the service frontend 206 may determine whether to transmit the request to a deployment control sub-system 210 of the robotic device management service 204. The deployment control sub-system 210 is implemented on a computer system or abstraction thereof (such as one or more virtual machines operating via a hypervisor), implemented using hardware and software, and can comprise one or more processors and memory that stores executable instructions whose execution by the one or more processors causes the computer system to perform operations described herein.

The deployment control sub-system 210, in response to the request, may obtain the robotic device application 218 from a data object within the object-based data storage service 214. For instance, the request may specify an identifier of the application 218, which the deployment control sub-system 210 may use to query a database that includes entries corresponding to network addresses for data objects used to store robotic device applications. From this database, the deployment control sub-system 210 may identify the network address of the data object that stores the robotic device application 218 corresponding to the provided identifier. The deployment control sub-system 210 may transmit the robotic device application 218 to the robotic devices 216 indicated in the request. For instance, if the customer selects a particular logical grouping of robotic devices 216 for installation of the application 218, the deployment control sub-system 210 may evaluate this logical grouping to identify the robotic devices 216 that comprise the logical grouping specified by the customer. The deployment control sub-system 210 may transmit the application 218 to each robotic device 216 over the communications channel established between the robotic device management service 204 and the robotic device 216. In an embodiment, rather than providing the application 218 to each robotic device 216, the deployment control sub-system 210 can transmit application data usable by the robotic device 216 to install and execute the application 218. The application data may include the network address of the data object or other datastore used to store the application 218, parameters for executing the application 218 (e.g., sensors to be utilized during execution of the application 218, computing resources to be accessed by the robotic device 216 for execution of the application 218, computer-executable code that may cause the robotic device 216 to record data that is to be stored within the application data repository 212, etc.), computer-executable code that includes the application 218 that, if executed, causes the robotic device 216 to install the application 218, and the like.

In an embodiment, if a robotic device 216 has not been previously registered with the robotic device management service 204, the deployment control sub-system 210 may initiate the registration process for the robotic device 216. During this registration process, the robotic device management service 204 may require the customer to create a digital certificate for the robotic device 216 in order to allow for authentication of the robotic device 216 in communications with the deployment control sub-system 210 and any other services of the computing resource service provider. The deployment control sub-system 210 may communicate with a network-connected device service to generate IoT information for the robotic device 216 and the digital certificate. Further, the deployment control sub-system 210 may transfer the digital certificate to the robotic device 216 to enable the robotic device 216 to present the digital certificate for authentication. In an embodiment, the deployment control sub-system 210 transmits a communications channel application to the robotic device 216 that, if installed and executed on the robotic device 216, enables the robotic device 216 to interact with the deployment control sub-system 210 and other computing resource services and to present the digital certificate for authentication.

In response to obtaining the robotic device application 218 from the deployment control sub-system 210, the robotic devices 216 may each install and execute the robotic device application 218. In an embodiment, the deployment control sub-system 210 monitors performance of each robotic device 216 of the selected logical groupings based on actions performed by each robotic device 216 during execution of the application 218. For instance, the deployment control sub-system 210 may determine, based on data obtained from a robotic device 216, that an issue exists with the application 218 being executed by the robotic device 216. In an embodiment, if the deployment control sub-system 210 determines that there is an issue with the application 218 being executed on a robotic device 216, the deployment control sub-system 210 provides an earlier version of the application 218 from the data object to the robotic device 216 for installation and execution. The deployment control sub-system 210 may maintain, in the data object maintained by the object-based data storage service 214, earlier versions of the application 218 in the event that the latest version of the application 218, updated based on simulations performed using the application 218, is found to have issues impacting performance of the robotic devices 216. Thus, the deployment control sub-system 210 may allow the robotic devices 216 to execute the earlier version of the application 218.

For each robotic device 216, the deployment control sub-system 210 may record data obtained from the robotic device 216 in an application data repository 212. This data may include telemetry data obtained by robotic device 216 via execution of the application 218 as it navigates through an environment. Further, the data may include sensor data, comprising information about the environment recorded via the various sensors on the robotic device 216. Through the communication channel between the deployment control sub-system 210 and the robotic device 216, communications between the robotic device 216 and the deployment control sub-system 210 may be maintained. For instance, the robotic device 216 may transmit a request, over this communications channel, to the deployment control sub-system 210 to access a set of resources provided by the robotic device management service 204 or by other computing resource services. Through the communications channel, the robotic device 216 may further provide data usable by the customer to visualize the environment that the robotic device 216 is interacting with. For instance, if the robotic device 216 includes a video recording device, the robotic device 216 may use the video recording device to stream video over the communications channel to the deployment control sub-system 210. The customer, through the service frontend 206, may access the video stream to watch the robotic device 216 in its environment. Through use of the service frontend 206 and the communications channel, the customer may interact with the robotic device 216 and issue commands to the robotic device 216 as needed through the interface provided via the service frontend 206. Further, the customer may use the service frontend 206 to obtain data from the application data repository 212 for any robotic device 216 of its logical groupings.

In an embodiment, the robotic device management service 204 utilizes the sensor data obtained from a robotic device 216 to update the application 218 installed on the robotic device, resulting in an updated application. For instance, the robotic device management service 204 may detect, based on the obtained sensor data, that there is an issue with the application 218 (e.g., the application has crashed resulting in a dearth of sensor data, the sensor data indicates performance of unexpected actions within an environment, the sensor data indicates failure of one or more sensors resulting from execution of the application, etc.). In response to the issue, the robotic device management service 204 may cause the robotic device 216 to rollback to an earlier version of the application 218 that does not trigger the issue identified by the robotic device management service 204. The robotic device management service 204 may transmit the earlier version of the application to the robotic device 216 to cause the robotic device 216 to install and execute this earlier version of the application 218. Alternatively, the robotic device management service 204 may provide the network address of the data object used to store the earlier version of the application 218. This may cause the robotic device 216 to use the network address to access the data object and obtain the earlier version of the application 218.

In an embodiment, the robotic device management service 204 uses the sensor data to create a new version of the application 218. For instance, based on the sensor data, the robotic device management service 204 may identify one or more improvements to the functions in the application 218 that, if implemented, may result in an optimization of the application 218. The robotic device management service 204 may transmit this new version of the application 218 to the robotic devices 216 to cause the robotic devices 216 to install and execute the new version of the application 218. Alternatively, the robotic device management service 204 may provide the network address of the data object used to store the new version of the application 218. This may cause the robotic device 216 to use the network address to access the data object and obtain the new version of the application 218. In an embodiment, the robotic device management service 204 provides suggestions for improvements to the application 218 to the customer to allow the customer to determine whether to implement the improvements and create a new version of the application 218. The customer may select, from the set of improvements suggested by the robotic device management service 204, one or more improvements to be implemented. Based on the response from the customer, the robotic device management service 204 may modify the computer-executable code of the application 218 to incorporate the selected one or more improvements and create a new version of the application 218 for deployment to the robotic devices 216.

Figure 3:
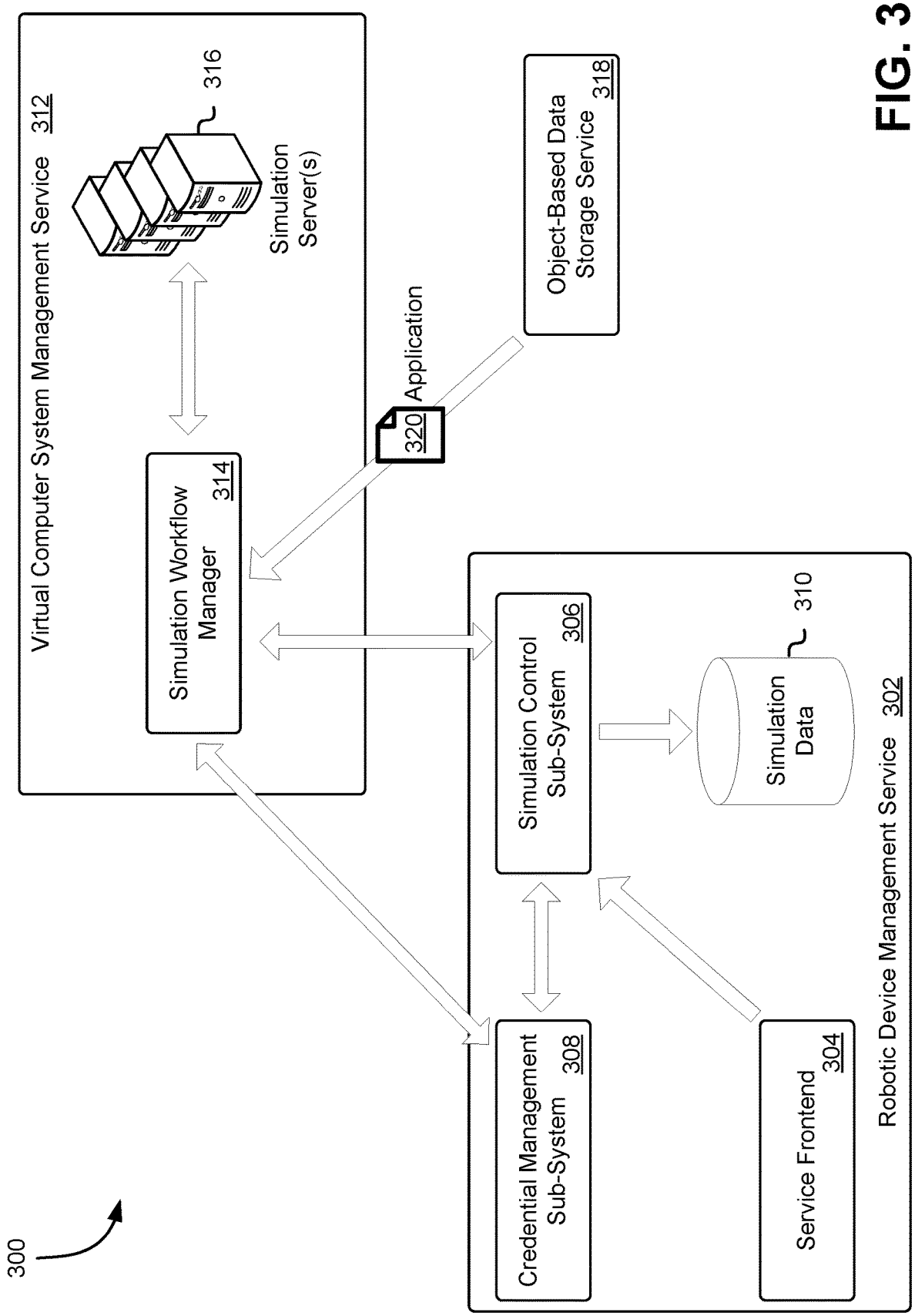
FIG. 3 shows an illustrative example of a system in which a simulation environment for a robotic device is generated using a set of simulation servers to obtain data usable to update a robotic device application in accordance with at least one embodiment.

FIG. 3 shows an illustrative example of a system 300 in which a simulation environment for a robotic device is generated using a set of simulation servers 316 to obtain data usable to update a robotic device application 320 in accordance with at least one embodiment. In the system 300, a customer of the robotic device management service 302 submits, through a service frontend 304, a request to initiate a simulation of a robotic device executing a robotic device application 320 and to train a reinforcement learning model usable to update and optimize the robotic device application 320. Through the service frontend 304, the customer may define a set of robotic device parameters and a set of simulation parameters, both of which may be used to generate a simulation environment and to perform the simulation of the robotic device application 320.

The robotic device parameters may include the names of the robotic devices that are to be tested via the simulation environment. These parameters may further include the sensors to be utilized by the robotic devices, the movement capabilities and limitations of the robotic devices, and the like. The simulation environment parameters may include the dimensions of a simulated room, the location of any obstacles to be encountered by the robotic device, the location of any objects that the robotic device can interact with, the initial position of the robotic device, a desired position of the robotic device at the end of the simulation, the number of simulations to be performed in parallel (e.g., simultaneous simulations to be performed for testing the robotic device application) and the like. In an embodiment, through the service frontend 304, the customer can define computer-executable code defining a custom-designed reinforcement function for training a reinforcement learning model for the robotic devices. For instance, the customer may specify, via an API call to the service frontend 304 (e.g., StartEvaluation( ), etc.) to initiate simulation of a particular application 320, the resource name for the reinforcement function that is to be used in training a reinforcement learning model for the application 320, the resource name of the simulation environment to be used for the evaluation, the termination conditions for the simulation (e.g., timeout periods, model convergence requirements, etc.) and the location and name of the data object utilized for storage of data generated via the simulation.

In an embodiment, the StartEvaluation( ) API call is used to create a new evaluation job (e.g., simulation and training) for a reinforcement learning model. The StartEvaluation( ) API call can include, as a string, the resource name of the reinforcement learning model that is to be trained, the resource name of the simulation environment defined by the customer through the interface, the location of a document or file that includes the termination conditions for the simulation, and the data object to be used for storage of simulation artifacts. In response to this API call, the service frontend 304 may provide the customer with a unique resource name corresponding to the simulation. This unique resource name may be used by the customer to request information regarding the evaluation or to perform other operations. For instance, through a GetEvaluation( ) API call, the customer can get information about the simulation for training a reinforcement learning model. The GetEvaluation( ) API call can include, as a string, the resource name of the evaluation. In response to this API call, the service frontend 304 may provide the network address of the data object that includes the details of the simulation. Alternatively, the service frontend 304 may access the data object to obtain the details of the simulation and provide the details directly to the customer.

In an embodiment, the customer can submit, through the service frontend 304, a ListEvaluations( ) API call to obtain an ordering of the simulations being performed for training a reinforcement learning model. The ListEvaluations( ) API call can include, as a string, the resource name of the reinforcement learning model. Optionally, the customer may define, in addition to the resource name, the maximum number of results to be returned per interface page, fields usable to sort the results by (e.g., creation time, etc.), the sort order for the results (e.g., ascending, descending, etc.), and a filter that is usable to retrieve only simulations with a specific status (e.g., in progress, completed, failed, stopping, stopped, etc.). In an embodiment, the customer can also submit, through the service frontend 304, a StopEvaluation( ) API call to stop a particular simulation for training the reinforcement learning model. The StopEvaluation( ) API call can include, as a string, the resource name of the simulation that is to be stopped.

In an embodiment, the customer can use an API call to the service frontend 304 (e.g., ImportModel( )) to import a reinforcement learning model and the computer-executable code defining the custom-designed reinforcement function. The API call may include, as parameters in a string, a unique name for the reinforcement learning model, the model type, the framework for the model, a description of the model, and the location of any model artifacts. Additionally, the customer can submit a DeleteModel( ) API call to request deletion of a reinforcement learning model from the customer's account and from a database maintained by the robotic device management service 302 detailing each available reinforcement learning model. The DeleteModel( ) API call can include, as a string, the identity of the reinforcement learning model. This may either be the name and type of the reinforcement learning model or the resource name of the reinforcement learning model that is to be deleted. The customer can also submit a GetModel( ) API call to request information for a specific reinforcement learning model. The GetModel( ) API call can include, as a string the identity of the reinforcement learning model, as described above. In an embodiment, the customer can use a ListModels( ) API call to the service frontend 304 to retrieve information for all reinforcement learning models available to the customer. The GetModel( ) API may include, as a string, the type of model to be retrieved (e.g., reinforcement learning models, object detection models, etc.), a pagination token, the maximum number of results to be returned on an interface page, the fields usable to sort results by (e.g., creation time, etc.), and the sort order for the results (e.g., ascending, descending, etc.).

In an embodiment, through the service frontend 304, the customer can submit a CreateReinforcementLearningModel( ) API call to the robotic device management service 302 to request creation of a reinforcement learning model that may be trained for a robotic device application 320. The CreateReinforcementLearningModel( ) API call can include, as a string, a unique name for the reinforcement learning model, the machine learning framework for the model (e.g., TensorFlow, MXNet, PyTorch, etc.), a description of the model, the algorithm for a robotic device agent performing the simulation using the model, the network of the agent, and the configuration of the training to be performed (e.g., a data object that defines how the model is to be trained, etc.).

In an embodiment, through the service frontend 304, the customer can submit a GetTrainingJob( ) API call to the robotic device management service 302 to obtain information about a training job (e.g., simulation) being performed for training a reinforcement learning model. The GetTrainingJob( ) API call may include, as a string, the resource name corresponding to the simulation being performed. For instance, when the customer submits a request to perform a simulation of the robotic device application 320 to train a reinforcement learning model, the service frontend 304 may provide the customer with a unique resource name for the simulation. Thus, through the API call, the customer may specify this unique resource name to obtain the details and status of the simulation. Through the service frontend 304, the customer may also submit a ListTrainingJobs( ) API to obtain an ordering of the simulations being performed to train the reinforcement learning model. The ListTrainingJobs( ) API call may include, as a string, the resource name of the reinforcement learning model, the maximum number of results to be returned on an interface page, and a pagination token. In response to this API call, the service frontend 304 may return the ordering of data objects that include the simulation details.

In an embodiment, through the service frontend 304, the customer can submit a StopTrainingReinforcementLearningModel( ) API call to stop training of a particular reinforcement learning model. This API call may include, as a string, the resource name of the reinforcement learning model for which training is to cease. Through the service frontend 304, the customer may also submit a CloneReinforcementLearningModel( ) API call to request cloning of an existing reinforcement learning model. The CloneReinforcementLearningModel( ) API call may include, as a string, the resource name of the reinforcement learning model to be cloned, a unique name for the new reinforcement learning model, the data object where the new reinforcement learning model artifacts are to be stored, and the data object or other file that defines how the new reinforcement learning model is to be trained.

Through the service frontend 304, the customer may define a set of hyperparameters for simulating the application 320 and training a reinforcement learning model usable to optimize the application 320. For example, the customer may define the batch size for the simulation, which may be used to determine the GPU requirements for the simulation. For example, the number of GPUs required for the simulation may increase in proportion to the batch size specified by the customer via the interface provided by the service frontend 304. The customer may also specify, through the interface, the number of epochs, which may correspond to the number of times the data generated through simulation of the application 320 is processed to train the reinforcement learning model. Similarly, through the interface, the customer may define the stack size for the simulation, the learning rate, the exploration parameters, the entropy rate, the discount factor, the loss type, and the number of episodes between each training iteration for the reinforcement learning model. In an embodiment, through the interface, the customer can also define the termination conditions for the simulation. For instance, the customer can specify the criteria for a simulation to terminate, including maximum time or maximum number of runs from the start of the simulation to its conclusion or failure.

In an embodiment, through the interface, the customer can define the simulation environment. For instance, the service frontend 304 may present to the customer, through the interface, different simulation environment templates that may be used to create a simulation environment for simulating the application 320. Through the interface, the customer may select and modify any of the simulation environment templates to define the simulation environment to be used in simulating and testing the application 320 and training the reinforcement learning model. Additionally, the customer may define the name of the reinforcement learning model and the custom-designed reinforcement function to be used to train the reinforcement learning model. The customer, through the interface, can request provisioning of a data object within an object-based data storage service 318 for storage of the application 320, the custom-designed reinforcement function, and the reinforcement learning model. Through the interface, the customer may also identify any access control policies that may be used to give the robotic device permission to perform actions in other services on behalf of the customer, including the data object. In an embodiment, through the interface, the customer can also create a development environment configured for development of the application 320. Through the interface, the customer can select a virtual computing instance type (e.g., the resources that comprise the virtual computing instance, including, but not limited to: CPUs available, GPUs available, storage capacity, etc.) that has the resources usable to build and bundle the robotic device parameters and the simulation applications that the customer wishes to develop. Through the interface, the customer may also enable monitoring of any activity within the customer's simulation environment through execution of the application 320.

The service frontend 304 may transmit the request to a simulation control sub-system 306 of the robotic device management service 302 to initiate creation of the simulation environment for training the reinforcement learning model and optimizing the application 320. The simulation control sub-system 306 is implemented on a computer system or abstraction thereof (such as one or more virtual machines operating via a hypervisor), implemented using hardware and software, and can comprise one or more processors and memory that stores executable instructions whose execution by the one or more processors causes the computer system to perform operations described herein. The simulation control sub-system 306 may obtain, from a credential management sub-system 308, a set of credentials usable for authentication when submitting a request to a simulation workflow manager 314 of a virtual computer system management service 312. The set of credentials may be generated by the robotic device management service 302 and maintained by the credential management sub-system 308 to enable other components of the robotic device management service 302 to access other services provided by the computing resource service provider. It should be noted that while a virtual computer system management service 312 is utilized throughout the present disclosure for the purpose of illustration, other services may be utilized for executing the parallel simulations of the application 320 using other resources provided by these services. These other services may include container services that may be used to provision software container instances for launching the parallel simulations, may utilize alternative file systems for maintaining simulation data and for executing the components of the simulation, and the like.

The credential management sub-system 308 is implemented on a computer system or abstraction thereof (such as one or more virtual machines operating via a hypervisor), implemented using hardware and software, and can comprise one or more processors and memory that stores executable instructions whose execution by the one or more processors causes the computer system to perform operations described herein. In some examples, the credentials maintained by the credential management sub-system are provided by the customer, whereby the credentials may be used by the simulation control sub-system 306 to enable access to the customer's resources within the virtual computer system management service 312 and other services to enable simulation of the application 320. Alternatively, the credentials maintained by the credential management sub-system 308 may be generated by the robotic device management service 302 itself, whereby the simulation servers 316 and virtual computing instances provisioned on these simulation servers 316 are part of a pool of resources of the robotic device management service 302 usable to simulate applications designated by customers of the robotic device management service 302.

The simulation control sub-system 306 may transmit a request to a simulation workflow manager 314 of the virtual computer system management service 312 to configure the simulation of the application 320. The request may include the set of parameters defined by the customer through the service frontend 304 for the simulation. Further, the request may include the set of credentials from the credential management sub-system 308 and the network address corresponding to the data object in the object-based data storage service 318 where the application 320 is stored and where the reinforcement learning model is to be stored once the simulation has been completed. In response to the request, the simulation workflow manager 314 may interact with the credential management sub-system 308 to validate the obtained set of credentials from the simulation control sub-system 306. If the set of credentials are valid, the simulation workflow manager 314 may initiate configuration of the simulation of the application 320. The simulation workflow manager 314 is implemented on a computer system or abstraction thereof (such as one or more virtual machines operating via a hypervisor), implemented using hardware and software, and can comprise one or more processors and memory that stores executable instructions whose execution by the one or more processors causes the computer system to perform operations described herein.

In response to the request, the simulation workflow manager 314 may access the object-based data storage service 318 to obtain the application 320 that is to be simulated and optimized based on training of the reinforcement learning model specified by the customer using the custom-designed reinforcement function defined by the customer via the service frontend 304. Further, the simulation workflow manager 314 may evaluate the various parameters provided by the customer via the service frontend 304 and the system requirements for the various components of the simulation to determine what virtual computing instances are to be provisioned in order to support execution of the application 320 in the simulation environment and to generate the simulation environment. For instance, the simulation workflow manager 314 may evaluate the obtained parameters to determine the computational requirements (e.g., memory, CPU requirements, GPU requirements, etc.) for executing and supporting the simulation and to determine the number of parallel simulations to be performed to train the reinforcement learning model based on different parameters for each of the parallel simulations to be performed (e.g., different simulation environment parameters for each parallel simulation, the components to be used for each parallel simulation, the reinforcement learning model to be trained for each parallel simulation, etc.). For example, the simulation workflow manager 314 may identify a set of components of the simulation (e.g., physics engines, rendering engines, etc.) needed to execute the simulation and to process actions of the robotic device within the simulation environment. Based on these computational requirements, the simulation workflow manager 314 may provision a set of virtual computing instances within a set of simulation servers 316 to execute the parallel simulations of the application 320.

In an embodiment, the simulation workflow manager 314 allocates the various components of the simulation among different virtual computing instances on the simulation servers 316 based on the system requirements of the components and the capabilities of the virtual computing instances. For example, the simulation workflow manager 314 may create, from the set of components, discretizable subsets of the simulation that may be apportioned among the virtual computing instances. The simulation workflow manager 314 may place a first set of components corresponding to a subset of the simulation within a virtual computing instance. If there is remaining capacity for additional components in the virtual computing instance, the simulation workflow manager 314 may allocate the next set of components within the same virtual computing instance. Otherwise, the simulation workflow manager 314 may allocate the next subset of the simulation on to another virtual computing instance. The simulation workflow manager 314 may continue this process until all components of the simulation have been allocated among the various virtual computing instances within the simulation servers 316.

In an embodiment, the simulation workflow manager 314 establishes, between each virtual computing instance utilized for the simulation, a network interface to enable secure communications among the various components of the simulation. The simulation workflow manager 314 may map the simulation to the customer's own virtual private network (as identified via the request) and/or to a customer's own virtual computing instances operating within an on-premises network. This ensures that resources necessary for execution of the simulation are available to the components executing the application 320 within the simulation environment. In an embodiment, the simulation workflow manager 314 maintains, within a simulation server 316, a robot application container that performs training of the reinforcement learning model based on actions performed by the simulated robotic device within the simulation environment based on the state of the robotic device and simulation environment prior to and after execution of the action. The training of the reinforcement learning model may further take into account the reward value, as determined via the custom-designed reinforcement function, corresponding to the action performed, the initial state, and the state attained via execution of the action. The robot application container may provide the updated reinforcement learning model to a simulation application container to utilize in the simulation of the application 320 and to obtain new state-action-reward data that may be used to continue updating the reinforcement learning model.

The simulation workflow manager 314 may monitor the virtual computing instances executing the simulation and the simulation servers 316 to ensure that the simulation is completed successfully. For instance, the simulation workflow manager 314 may measure the CPU utilization, GPU utilization, memory utilization, and the like for each virtual computing instance to determine whether there is a potential issue. The simulation workflow manager 314 may also request, from each virtual computing instances, proving messages with measures and/or statistics that may be used to detect an issue with performance of the virtual computing instances. In an embodiment, if the simulation workflow manager 314 determines that a virtual computing instance has failed, or is otherwise inoperative, the simulation workflow manager 314 may determine whether any components of the simulation are impacted by the failure. If so, the simulation workflow manager 314 may determine the system requirements for each of the impacted components and determine, based on these system requirements, if the existing set of virtual computing instances can accommodate these impacted components. If so, the simulation workflow manager 314 may migrate the impacted components among the existing, operating virtual computing instances. However, if the existing set of virtual computing instances are unable to accommodate the impacted components of the simulation, the simulation workflow manager 314 may provision new virtual computing instances among the simulation servers 316 to accommodate these impacted components of the simulation. The simulation workflow manager 314 may migrate the impacted components to the new virtual computing instances and resume simulation of the application 320.

Similarly, if the simulation workflow manager 314 detects a surge in the workload of the components of the simulation, the simulation workflow manager 314 may determine whether this surge in the workload of the components of the simulation requires additional resources to ensure that the simulation is completed successfully without negatively impacting the latency between the components of the simulation. If the surge in the workload of the components of the simulation results in a determination that additional resources are needed, the simulation workflow manager 314 may determine which components need to be migrated to new virtual computing instances to ensure successful completion of the simulation. The simulation workflow manager 314 may determine the system requirements of these components and, based on these system requirements, provision new virtual computing instances capable of accommodating these components. The simulation workflow manager may migrate the identified components to the new virtual computing instances and resume simulation of the application 320.

In an embodiment, simulation data generated by the virtual computing instances via execution of the simulation is transmitted to a computing resource monitoring service where it is stored and accessed by the simulation control sub-system 306 of the robotic device management service 302. The simulation control sub-system 306 may obtain the simulation data from the computing resource monitoring service and store the data in a simulation data repository 310, where it is made available to customers of the robotic device management service 302. Thus, through the service frontend 304, the customer may obtain the simulation data from the simulation data repository and determine the status of the simulation and/or modify the simulation and the application 320 based on the data. In an embodiment, the simulation servers 316 provide, via one or more visualization applications, access to the simulation in real-time. This may allow customer, via the service frontend 304, to evaluate performance of the simulation during execution of the simulation.

The simulation workflow manager 314 may monitor execution of the simulation to determine whether a termination condition has been satisfied. For instance, if the maximum allowable time for execution of the simulation has elapsed, the simulation workflow manager 314 may terminate the simulation and transmit the latest version of the reinforcement learning model and the application 320 to the data object in the object-based data storage service 318. Alternatively, a termination condition may be satisfied if the maximum number of iterations for the simulation has been reached. In some instances, a termination condition may be defined by the attainment of an average reward value for the simulation through execution of actions in the simulation environment over a minimum number of iterations of the simulation. If any of these termination conditions are met, the simulation workflow manager 314 may update the application 320 based on the latest reinforcement learning model and store the application 320 and the latest reinforcement learning model in the object-based data storage service 318. Additionally, the simulation workflow manager 314 may transmit a notification to the simulation control sub-system 306 to indicate that the simulation of the application 320 has been completed.

The simulation control sub-system 306 may notify the customer, via the service frontend 304, that the simulation has been completed. The customer, through the service frontend 304, may evaluate the latest reinforcement learning model and the application 320 to determine whether to maintain the optimizations to the application 320 or to modify the application 320. Further, the customer may define new parameters and new custom-designed reinforcement functions to obtain alternative reinforcement learning models and new updates to the application 320 based on these alternative reinforcement learning models. If the customer is satisfied with the new reinforcement learning model and application 320, the customer may submit a request, via the service frontend 304, to install the application 320 on a set of robotic devices.

Figure 4:
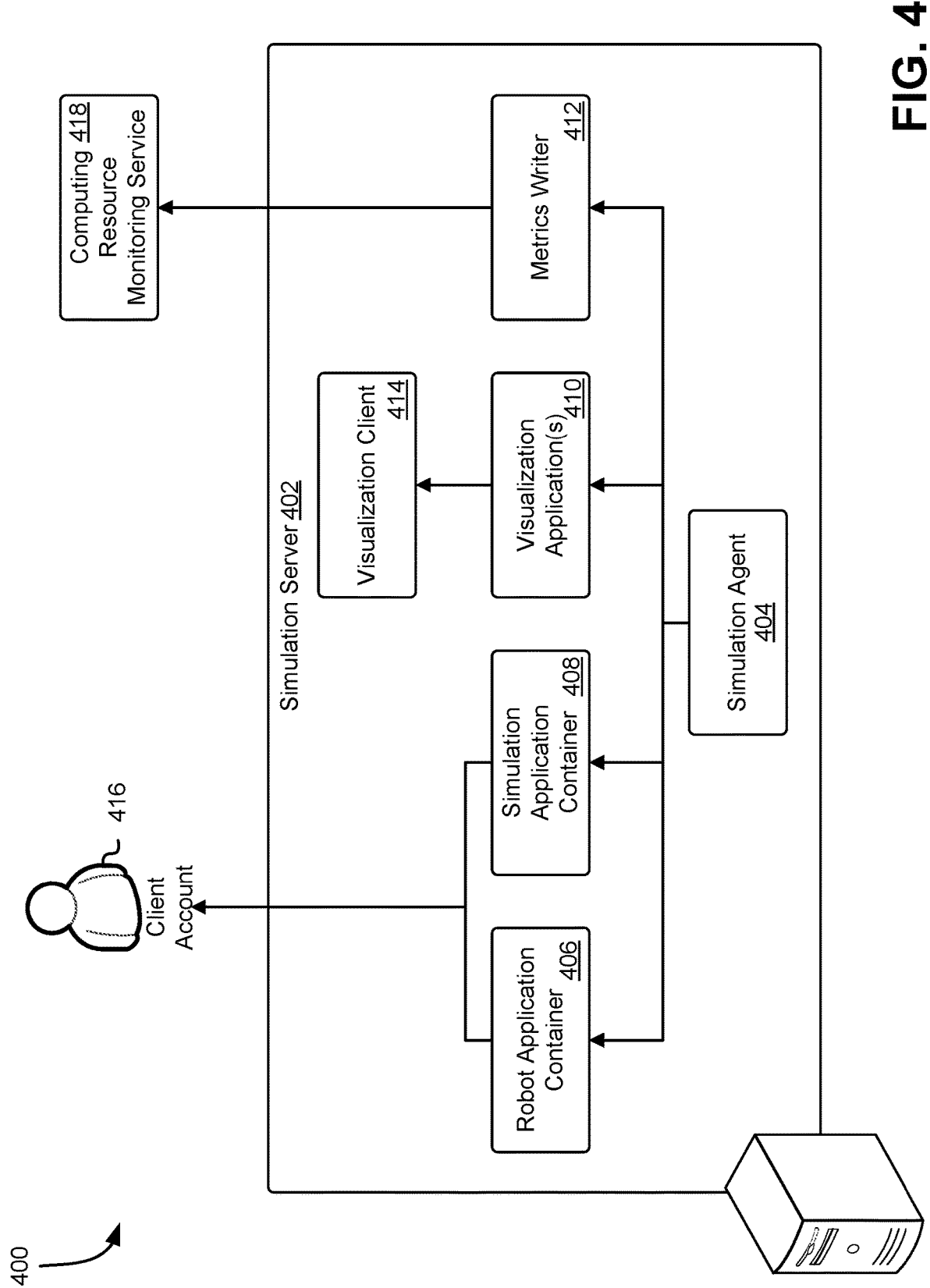
FIG. 4 shows an illustrative example of a system in which a simulation server executes a simulation of a robotic device application and processes data generated through the execution of the simulation in accordance with at least one embodiment.

FIG. 4 shows an illustrative example of a system 400 in which a simulation server 402 executes a simulation of a robotic device application and processes data generated through the execution of the simulation in accordance with at least one embodiment. In the system 400, a simulation server 402 includes a simulation agent 404 that manages the various components of a simulation and orchestrates training of a reinforcement learning model using a custom-designed reinforcement function provided by a customer of the robotic device management service. The simulation agent 404 is implemented using hardware and software of the simulation server 402 or abstraction thereof (such as one or more virtual machines operating via a hypervisor) and can comprise one or more processors and memory that stores executable instructions whose execution by the one or more processors causes the computer system to perform operations described herein. In an embodiment, the simulation agent 404 is a container instance configured with a software container that includes code executable (e.g., by the resources associated with the container instance) to perform functions in accordance with techniques described herein. In an embodiment, a "container instance" refers to a computer system instance (virtual or non-virtual, such as a physical computer system running an operating system) that is configured to launch and run software containers.

The simulation agent 404 may provision a robot application container 406 for execution of a training application usable to train the reinforcement learning model for the robotic device application. The robotic application container 406 may include computer-executable code that may utilize tuples or other data that specifies an initial state of a simulation environment, an action performed in response to the initial state, a resulting state of the simulation environment, and a reward value assigned to the action based on the resulting state of the simulation environment. In an embodiment, the training application of the robot application container 406 may obtain this data from a memory buffer, such as a ring buffer, populated as a result of execution of actions within the simulation environment. The training application may obtain data from the memory buffer at regular intervals or in response to a triggering event (e.g., the memory buffer is near or at capacity, etc.). The robot application container 406 may utilize the data as input to the training application to update the reinforcement learning model for the robotic device application being simulated. The robot application container 406 may transmit the updated reinforcement learning model to a simulation application container 408, which may use the updated reinforcement learning model to perform another simulation of the robotic device application and generate more data.

The simulation agent 404 may also provision the simulation application container 408 for execution of a simulation application that generates data usable by the robot application container 406 to update the reinforcement learning model. The simulation agent 404 may provide the simulation application container 408 with the robotic device application and the reinforcement function defined by the customer for execution in the simulation environment. Further, the simulation agent 404 may provide the set of parameters defined by the customer for the robotic device and for the simulation to enable the simulation application container, through a simulation application, to generate the simulation environment and execute the simulation using the robot device application and reinforcement function.

In an embodiment, the simulation application container 408 initiates the simulation using a randomized reinforcement learning model, whereby the simulation application container uses the model to select, based on an initial state of the simulation environment, a random action to be performed. The simulation application container 408 may execute the action and determine the resulting state of the simulation environment. Using the reinforcement function, the simulation application container 408 may determine the corresponding reward value for the tuple comprising the initial state, action performed, and resulting state of the simulation environment. The simulation application container 408 may store this data point in the memory buffer and execute another action based on the current state of the simulation environment. Through this process, the simulation application container 408 may continue to add data points to the memory buffer. In an embodiment, the simulation application container 408 utilizes a policy function to identify an initial state for the simulation, which may be used to select the appropriate action. Additionally, or alternatively, the simulation application container 408 may utilize a value function to select, from a set of pairings of states and actions, a pairing comprising an initial state and a corresponding action that is performable in response to the state. This may be used as input to the simulation application to cause the simulation application to perform the action.

The simulation application container 408 may obtain an updated reinforcement learning model from the robot application container 406. In response to obtaining the updated reinforcement learning model, the simulation application container 408 may perform another iteration of the simulation to generate new data points usable to continue updating the reinforcement learning model. The robot application container 406 may evaluate the reinforcement learning model to determine whether a termination condition has been met. For instance, if based on the data points obtained from the memory buffer, the robot application container 406 determines that the reinforcement learning model has converged on an optimal solution, the robot application container 406 may transmit a notification to the simulation agent 404 to indicate completion of the simulation. Similarly, the robot application container 406 may determine that a termination condition has been satisfied based on the number of data points processed from the memory buffer or in response to a determination that a time limit for performance of the simulation has elapsed. The robot application container 406 and the simulation application container 408 may provide simulation updates to a client account 416, which the customer may access to determine the state of the simulation.

In an embodiment, based on the simulation parameters and the robotic device parameters, the simulation agent 404 executes one or more visualization applications 410 to allow the customer to interact and visualize the simulation as it is being performed. The one or more visualization applications 410 may generate a graphical representation of the simulation, which may include a graphical representation of the simulation environment and a graphical representation of the robotic vehicle, whose actions may be represented on the graphical representation of the simulation environment. The one or more visualization applications 410 may provide the generated graphical representations of the simulation environment and of the robotic device to a visualization client 414 of the simulation server 402. The visualization client 414 is implemented using hardware and software of the simulation server 402 or abstraction thereof (such as one or more virtual machines operating via a hypervisor) and can comprise one or more processors and memory that stores executable instructions whose execution by the one or more processors causes the computer system to perform operations described herein. The visualization client 414 may be accessed through the service frontend of the robotic device management service, which may allow customers to access the visualization client 414 and view, through an interface, the graphical representation of the simulation.

The simulation agent 404 also executes a metrics writer 412 within the simulation server 402. The metrics writer 412 is implemented using hardware and software of the simulation server 402 or abstraction thereof (such as one or more virtual machines operating via a hypervisor) and can comprise one or more processors and memory that stores executable instructions whose execution by the one or more processors causes the computer system to perform operations described herein. The metrics writer 412 may obtain simulation data from the robot application container 406 and the simulation application container 408 and utilize this simulation data to generate a set of data logs comprising metrics corresponding to the performance of the simulated robotic device in the simulation environment. The metrics writer 412 may transmit these data logs to a computing resource monitoring service 418, which may make the data logs available to the customer via the robotic device management service.

Figure 5:
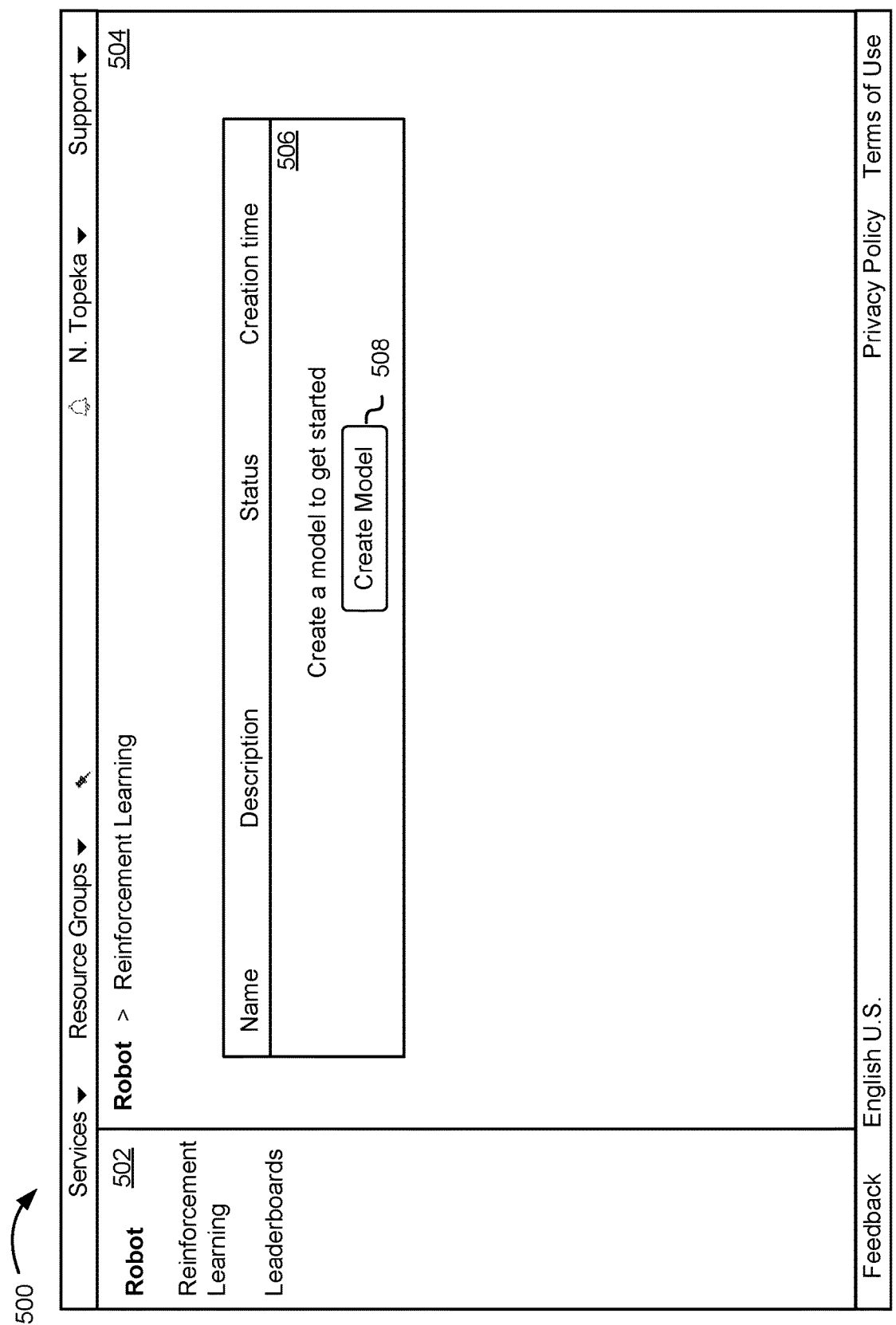
FIG. 5 shows an illustrative example of an interface for generating a reinforcement learning model for simulation of a robotic device using a robotic device application in accordance with at least one embodiment.

FIG. 5 shows an illustrative example of an interface 500 for generating a reinforcement learning model for simulation of a robotic device using a robotic device application in accordance with at least one embodiment. The interface 500 may include a selection panel 502 whereby a customer of the robotic device management service may select, from a menu of different options, an option to create a new reinforcement learning model or an option to generate leaderboard comprising rewards values for different reinforcement learning models utilized in a particular simulation environment. In an embodiment, the robotic device management service exposes one or more APIs for defining and managing a leaderboard, which may be presented via the interface 500 in response to selection of the leaderboard option in the selection panel 502. For instance, the customer may submit a CreateLeaderboard( ) API call to request creation of a new public or private leaderboard. The CreateLeaderboard( ) API call can include, as a string, a unique name for the leaderboard, a description for the leaderboard, the epoch time after which the leaderboard will be closed, the minimum number of executions to qualify for the leaderboard, whether the leaderboard is public or private, an access code if the leaderboard is private, and a resource name corresponding to the simulation environment. The customer can also submit a DeleteLeaderboard( ) API call, which may include, as a string, the unique name of the leaderboard that is to be deleted. The customer may submit, through the interface 500, a CloseLeaderboard( ) API call to close an existing leaderboard. The CloseLeaderboard( ) API call may include, as a string, the name of the leaderboard that is to be closed.

In some instances, the customer may submit, through the interface 500, a JoinLeaderboard( ) API call to join an existing public or private leaderboard. The JoinLeaderboard( ) API call may include, as a string, the name of the leaderboard that the customer wishes to join. Further, the customer may provide, as part of the string, an access code to join a private leaderboard. The customer may also submit a ListEligibleLeaderboardsForModel( ) API call to obtain an ordering of leaderboards that can accept the reinforcement learning model maintained by the customer and trained through simulation of the robotic device application. This API call may include, as a string the resource name of the reinforcement learning model, a pagination token, and the maximum number of results to be presented per interface page. In response to this API call, the robotic device management service may determine which robotic device applications and simulation environments may be used for the reinforcement learning model and identify any leaderboards associated with these applications and simulation environments.

Through the interface 500, the customer may also submit a GetLeaderboard( ) API call to request leaderboard data, including high scores (e.g., reward values), reinforcement learning models utilized in the simulations associated with the leaderboard, and the like. The GetLeaderboard( ) API call may include, as a string, the name of the leaderboard for which the customer wishes to obtain data for. The customer may also submit a ListLeaderboardSubmissions( ) API call to request an ordering of the specified leaderboard submissions. The response to this API call may be returned sorted by rank. The API call may include, as a string, the name of the leaderboard, a pagination token, and the maximum number of results that are to be returned per interface page. Through the interface 500, the customer may also submit a GetUserSubmission( ) API call to obtain a user submission that is currently on the leaderboard. The GetUserSubmission( ) API may include, as a string, the name of the leaderboard for which the customer wishes to obtain the user submission. In some instances, the customer may specify the specific identifier corresponding to the user submission. The customer may also submit a ListLeaderboards( ) API call to obtain an ordering of leaderboards which the customer has access to. This API call may include, as a string, a filter for searching through the leaderboards maintained by the robotic device management service, a pagination token, and a maximum number of results to be returned per interface page. Further, the customer may provide, as a Boolean, an indication whether to return leaderboards that include a submission by the customer.

If the customer selects, from the selection panel 502, the reinforcement learning option, the customer may be presented with a reinforcement learning window 504. Through the reinforcement learning window 504, the robotic device management service may present the customer with a reinforcement learning model window 506. The reinforcement learning model window 506 may provide customers with an ordering of their reinforcement learning models for a particular robotic device application. For instance, the reinforcement learning model window 506 may present, for each available model, the name of the model, a description of the model, the status of the model (e.g., converged, being updated via simulation, etc.), and the time at which the reinforcement learning model was created. In addition to providing details for every available model, the reinforcement learning model window 506 may present customers with an option to generate a new reinforcement learning model. For example, as illustrated in FIG. 5, the reinforcement learning model window 506 may include a create model button 508 that, if selected, may cause the robotic device management service to update the reinforcement learning window 504 to present a customer with various options for creating the reinforcement learning model.

FIG. 6 shows an illustrative example of an interface 600 for creating the simulation for a robotic device using a robotic device application and the reinforcement learning model for optimizing the application in accordance with at least one embodiment. The interface 600 may share elements similar to those described above in connection with FIG. 5. For instance, the interface 600 may include a selection panel 602 similar to the selection panel 502 described above. The interface 600 may include a create model window 604, which may be presented to the customer in response to selecting the create model button 508 described above in connection with FIG. 5.

The create model window 604 may be used to present the customer with a model details window 606, through which the customer may define, through a model name entry box 608, the desired name for the simulation. Further, the customer may provide, through a model description entry box 610, a description of the simulation. In some instances, an entry in the model description entry box 610 is not required. Through the model details window 606, the customer may also define the access control policies that may be used to give the robotic device permission to perform actions in other computing resource services on behalf of the customer. Further, through the model details window 606, the customer may select or otherwise provision a data object for storage of the robotic device application, the reinforcement learning model, and other data generated through simulation of the robotic device application. The model details window 606 may present customers with a create policy and data object button 612, which the customer may select to define the access control policies and select or otherwise provision the data object to be associated with the simulation.

The create model window 604 may also be used to present the customer with an environmental simulation window 614, through which the customer may define the simulation environment for the simulation. In an embodiment, the robotic device management service may provide several default simulation environments that may be used as templates by the customer to create customized simulation environments. For instance, the robotic device management service may populate the environmental simulation window 614 with one or more simulation environment templates 616, which the customer may choose from. If the customer selects a simulation environment template 616 from the environmental simulation window 614, the robotic device management service may allow the customer to make modifications to the template. This may include adding dynamic or stationary obstacles to the simulation environment, changing the layout of the simulation environment, and the like. In an embodiment, through the interface 600, the customer can submit a ListEnvironments( ) API call to obtain an ordering of the simulation environments available for selection. Further, through the interface 600, the customer may submit a GetEnvironment( ) API call to obtain metadata of the selected simulation environment. The GetEnvironment( ) API call may include, as a string, the resource name of the selected simulation environment. The metadata may include the parameters of the simulation environment, as described above.

Figure 7:
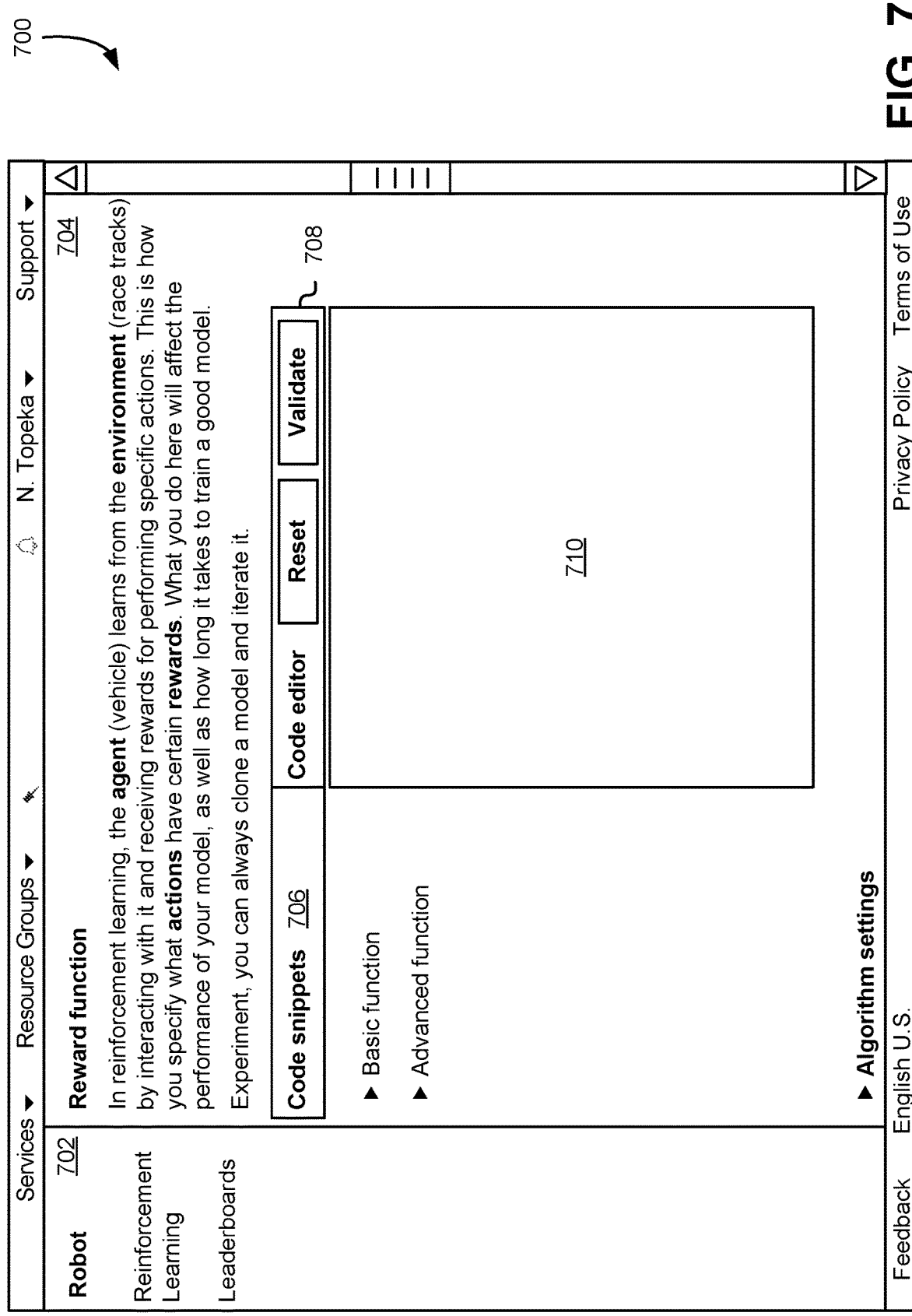
FIG. 7 shows an illustrative example of an interface for creating a custom-designed reinforcement function for training a reinforcement learning model in accordance with at least one embodiment.

FIG. 7 shows an illustrative example of an interface 700 for creating a custom-designed reinforcement function for training a reinforcement learning model in accordance with at least one embodiment. The interface 700 may include, much like the interfaces described above, a selection panel 702 whereby a customer of the robotic device management service may select, from a menu of different options, an option to create a new reinforcement learning model or an option to generate leaderboard comprising rewards values for different reinforcement learning models utilized in a particular simulation environment. The interface 700 may also include a reward function window 704, through which a customer may define the reinforcement function (otherwise known as a reward function) for defining reward values for actions and states of the simulation environment.

Through the reward function window 704, the robotic device management service may present the customer with a code editor 710, through which the customer may define, using computer-executable code, the reinforcement learning function for training the reinforcement learning model. Through the code editor 710, the customer may generate the computer-executable code using any programmatic language (e.g., Python, C++, etc.). Once the customer has defined, through the code editor 710, the computer-executable code defining the reinforcement function, the customer may use the code editor banner 708 to either request validation of the reinforcement function or to reset the code editor. If the code editor banner 708 is used to request validation of the reinforcement function, the robotic device management service may evaluate the computer-executable code to identify any errors that may prevent compilation of the computer-executable code. Further, the robotic device management service may identify one or more snippets of the computer-executable code that define the reward values for a set of state-action tuples. The robotic device management service may provide these snippets of code in windows associated with a code snippets banner 706 as described in further detail below. In an embodiment, the customer can submit, through the interface 700, a TestReinforcementFunction( ) API call, which can be used to test the reinforcement function defined through the code editor 710. The TestReinforcementFunction( ) API call may include, as a string, the computer-executable code provided through the code editor 710. In response to this API call, the robotic device management service may provide any identified errors resulting from evaluation of the computer-executable code.

Figure 8:
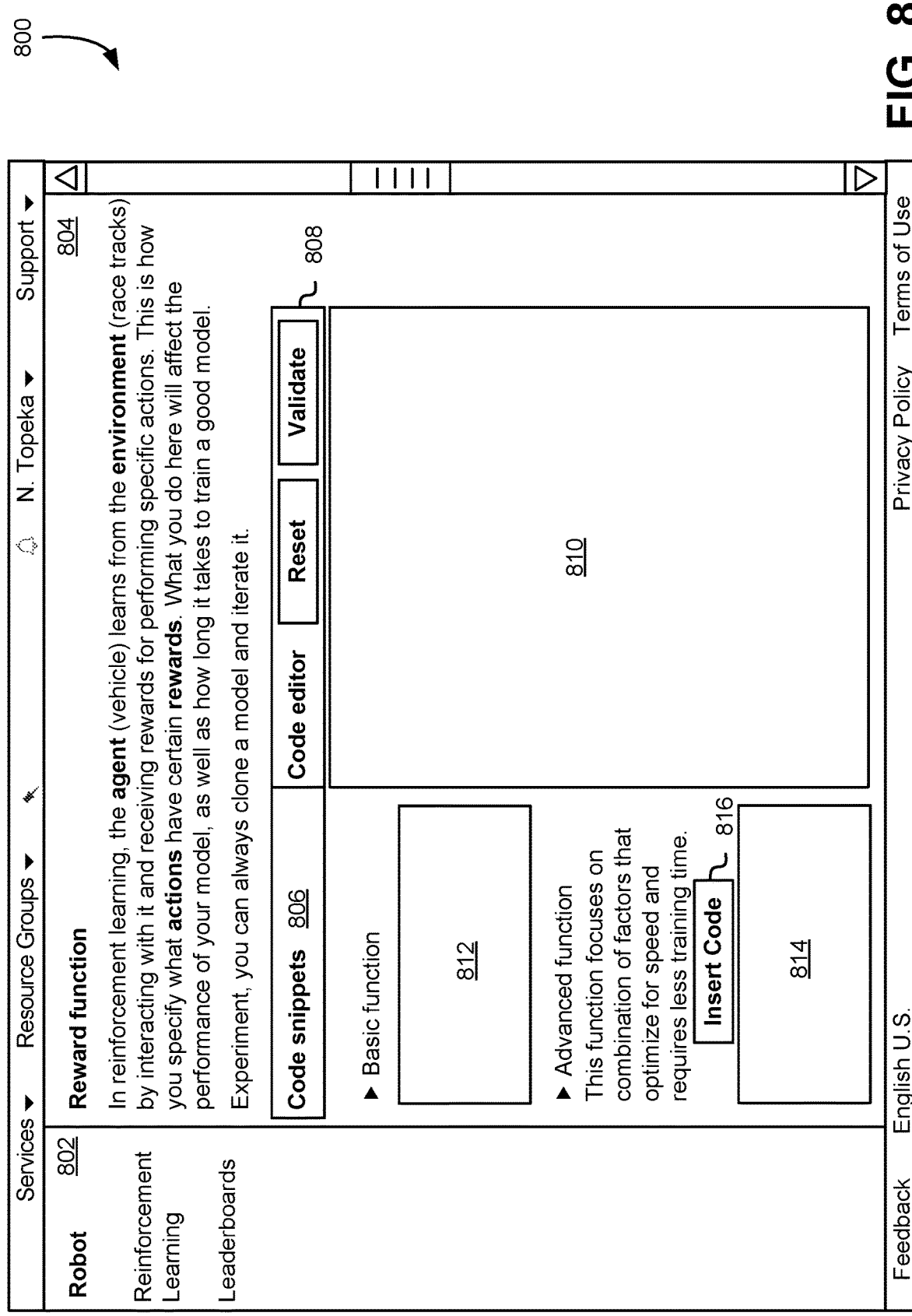
FIG. 8 shows an illustrative example of an interface for creating a custom-designed reinforcement function for training a reinforcement learning model in accordance with at least one embodiment.

FIG. 8 shows an illustrative example of an interface 800 for creating a custom-designed reinforcement function for training a reinforcement learning model in accordance with at least one embodiment. The interface 800 may be similar to the interface 700 described above in connection with FIG. 7. For instance, the interface 800 may include a selection panel 802 whereby a customer of the robotic device management service may select, from a menu of different options, an option to create a new reinforcement learning model or an option to generate leaderboard comprising rewards values for different reinforcement learning models utilized in a particular simulation environment. Further, the interface 800 may include a reward function window 804 that includes a code editor 810, a code editor banner 808, and a code snippets banner 806.

As noted above, the robotic device management service may evaluate the computer-executable code provided through the code editor 810 to identify functions within the code that are used to define the reinforcement function. The robotic device management service may update a basic function window 812 to present the identified functions. In an embodiment, the robotic device management service evaluates the computer-executable code, including the functions identified and presented through the basic function window 812, to identify a set of suggestions that may be used to enhance the reinforcement function. These suggestions may be based on historical use of the code editor 810 to generate computer-executable code for reinforcement functions applied to the selected simulation environment using similar robotic devices. These suggestions may be presented to the customer via an advanced function window 814, which may include a modified version of the functions specified in the basic function window 812.

The robotic device management service may provide, through the reward function window 804, an insert code button 816. The customer may select the insert code button 816 to request insertion of the functions specified in the advanced function window into the code editor 810. This may cause the robotic device management service to replace the snippet of code used to update the basic function window 812 with the snippet of code from the advanced function window 814. The customer may use the code editor banner to request validation of the reinforcement function including the snippet of code inserted from the advanced function window 814. If the reinforcement function is successfully validated and compiled by the robotic device management service, the robotic device management service may add the reinforcement function to the data object specified through the interface.

Figure 9:
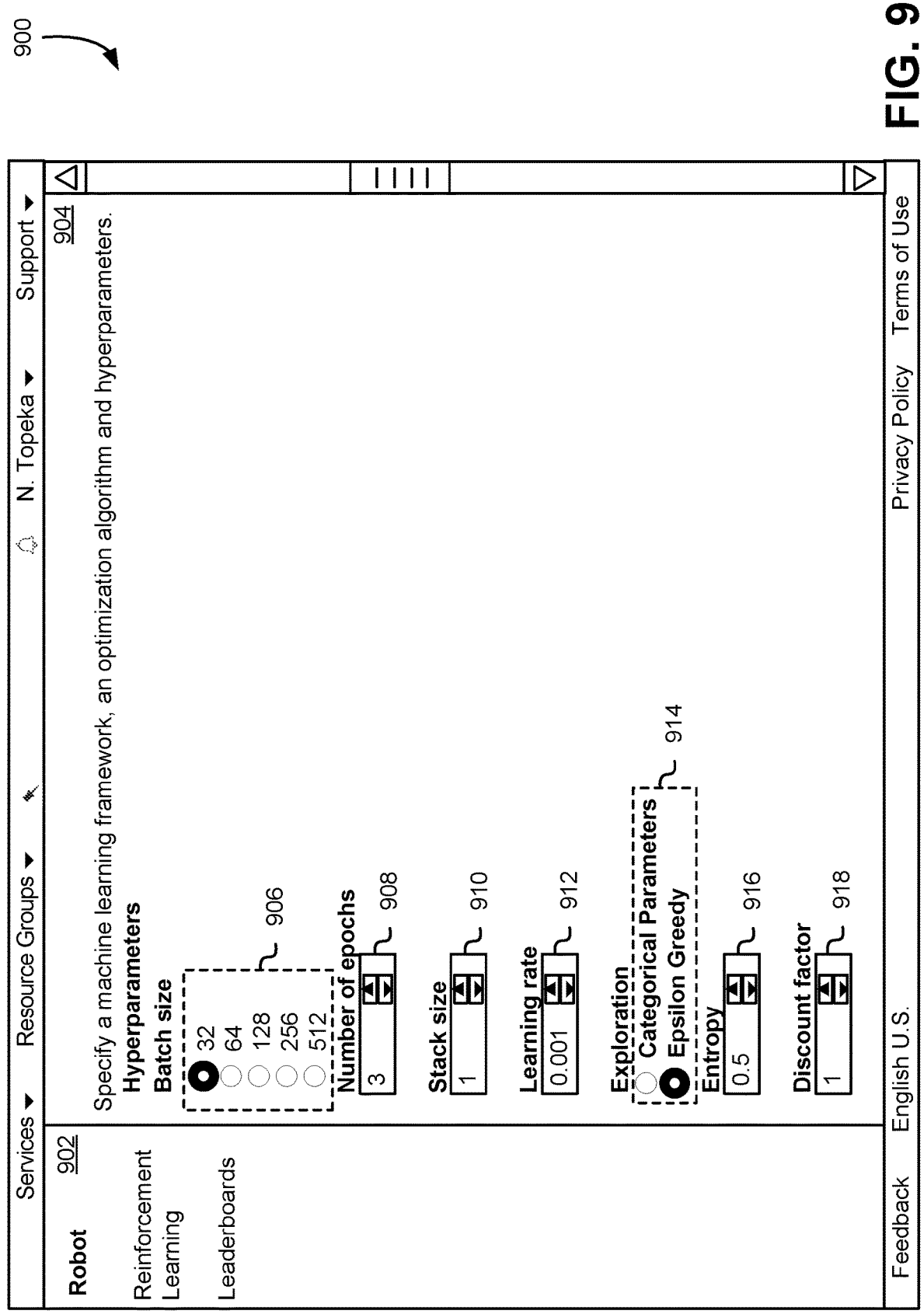
FIG. 9 shows an illustrative example of an interface for specifying the machine learning framework for training the reinforcement learning model in accordance with at least one embodiment.

FIG. 9 shows an illustrative example of an interface 900 for specifying the machine learning framework for training the reinforcement learning model in accordance with at least on embodiment. The interface 900 may include similar elements as the other interfaces described above in connection with FIGS. 5-8. For instance, the interface 900 may include a selection panel 902 whereby a customer of the robotic device management service may select, from a menu of different options, an option to create a new reinforcement learning model or an option to generate leaderboard comprising rewards values for different reinforcement learning models utilized in a particular simulation environment.

In an embodiment, the interface 900 includes a machine learning framework window 904, through which the customer can define the machine learning framework, an optimization algorithm, and the hyperparameters for training the reinforcement learning model. For instance, the machine learning framework window 904 may include batch size radio buttons 906 for selecting the batch size for the simulation, an epoch selection panel 908 for selecting the number of epochs for the simulation, a stack size panel 910 for selecting the stack size for the simulation, and a learning rate panel 912 for determining the learning rate for the reinforcement learning model. Additionally, the machine learning framework window 904 may include exploration radio buttons 914, through which the customer may define the exploration algorithm to be used for training the reinforcement learning model (e.g., using categorical parameters, epsilon greedy algorithms, etc.). The machine learning framework window 904 may also include an entropy selection panel 916 through which the customer may define the entropy of predicted actions to determine the training loss at the end of each epoch. Through a discount factor panel 918, the customer may also define the discount factor, which is used to determine the importance of future rewards through performance of actions in the simulation.

Figure 10:
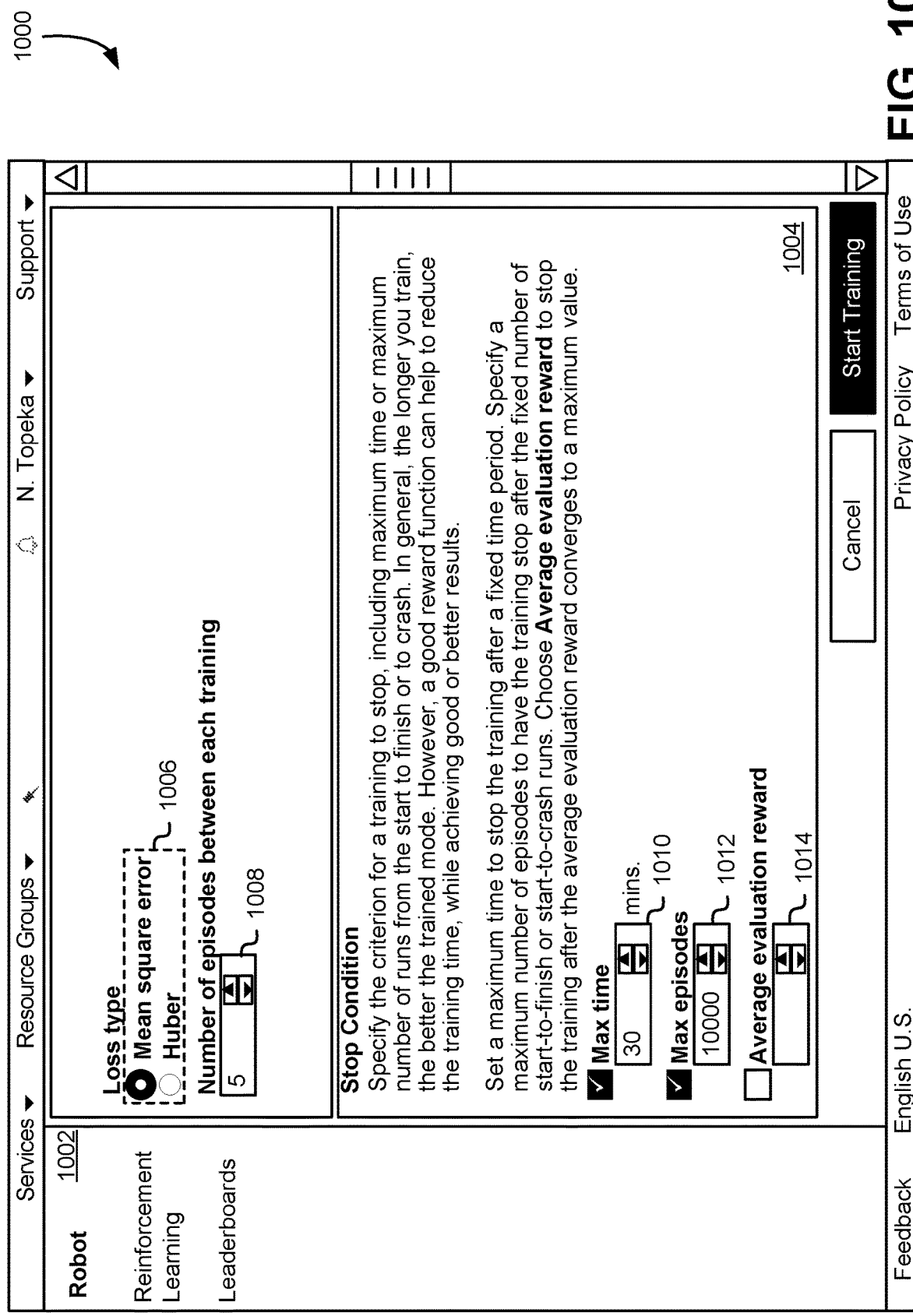
FIG. 10 shows an illustrative example of an interface for defining the termination conditions for completing training of a reinforcement learning model in accordance with at least one embodiment.

As illustrated in FIG. 10, additional options may be presented through the interface 1000 to define the machine learning framework. For instance, the interface 1000 may provide loss type radio buttons 1006, through which the customer may define the loss function for the training of the reinforcement learning model. As illustrated in FIG. 10, the customer may select from a mean squared error loss function or a Huber loss function, although other loss functions may be made available to the customer and presented via the loss type radio buttons 1006. Additionally, through the interface 1000, the customer may select the number of episodes between each training iteration through an episode selection panel 1008. It should be noted that the loss type radio buttons 1006 and the episode selection panel 1008 may be part of the machine learning framework window 904 described above in connection with FIG. 9. For instance, the customer may scroll down on the machine learning framework window 904 to access the loss type radio buttons 1006 and the episode selection panel 1008.

FIG. 10 further shows an illustrative example of an interface 1000 for defining the termination conditions for completing training of a reinforcement learning model in accordance with at least one embodiment. The interface 1000 may include the selection panel 1002 that is similarly used in the other interfaces described above in connection with FIGS. 5-9. Further, the interface 1000 may include a termination condition window 1004, through which the customer may define and select the termination conditions for terminating simulation and training of a reinforcement learning model. For instance, the termination condition window 1004 may include a maximum time panel 1010, through which the customer may define the maximum amount of time for performance of the simulation and for training the reinforcement learning model. Additionally, the termination condition window 1004 may include a maximum episodes panel 1012, through which the customer may define the maximum number of iterations to be performed before terminating the simulation. The termination condition window 1004 may further include an average evaluation reward selection panel 1014, through which the customer may define the average reward value that, if achieved through iterating through the simulation and updating the reinforcement learning model, may indicate that convergence of the model has been achieved. From these termination conditions, the customer may select which to implement for the simulation through the termination condition window 1004.

Figure 11:
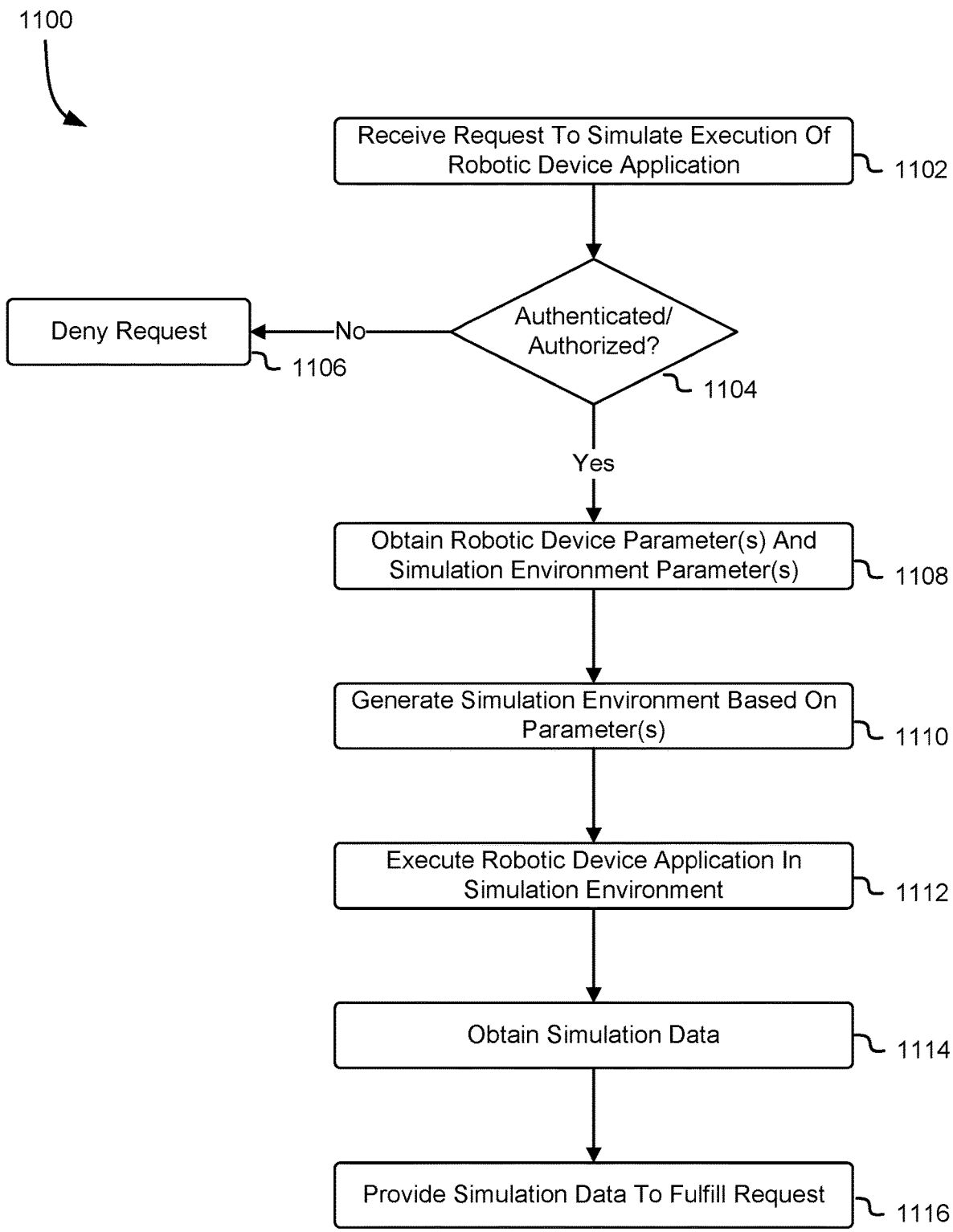
FIG. 11 shows an illustrative example of a process for performing a simulation of a robotic device application and providing simulation data resulting from execution of the simulation in accordance with at least one embodiment.

FIG. 11 shows an illustrative example of a process 1100 for performing a simulation of a robotic device application and providing simulation data resulting from execution of the simulation in accordance with at least one embodiment. The process 1100 may be performed by the robotic device management service in coordination with the simulation workflow manager 314 described above in connection with FIG. 3. For instance, the simulation workflow manager may execute the simulation while the robotic device management service may perform other operations as described below to define the simulation environment and obtain simulation data generated through execution of the simulation.

In an embodiment, the robotic device management service receives 1102, from a customer, a request to simulate execution of the robotic device application. As noted above, the robotic device management service may provide to the customer, via a client device of the customer, an interface through which the customer may submit the request and define a set of robotic device parameters and simulation environment parameters. For instance, as described above in connection FIGS. 5-10, the customer may use the interface to select an existing reinforcement learning model and a location of a data object comprising the robotic device application to be tested and utilized to store simulation data generated via simulation of the robotic device application. Further, through the interface, the customer may define the machine learning framework for the simulation, as well as the termination conditions for the simulation.

In response to the request, the robotic device management service may determine 1104 whether the customer can be authenticated and, if so, whether the customer is authorized to submit such a request. If the customer cannot be authenticated or is otherwise not authorized to submit this request, the robotic device management service may deny 1106 the request. However, if the customer is successfully authenticated and is authorized to submit the request, the robotic device management service may obtain 1108 the robotic device parameters and the simulation environment parameters for generating the simulation environment and executing the simulation. These parameters may be included in the request from the customer, such as through use of the interface described above in connection with FIGS. 5-10. Alternatively, the customer may define, through the interface, a data object or other storage location of these parameters. The robotic device management service may access the data object or other storage location to obtain 1108 the parameters.

As noted above, the robotic device management service may provide the request and parameters to a simulation workflow manager of a virtual computing system management service for execution of the simulation. The simulation workflow manager, in an embodiment, uses the set of parameters identified by the customer to generate 1110 the simulation environment and to execute 1112 the robotic device application in the simulation environment to train a reinforcement learning model and to generate simulation data. For instance, in response to the request, the simulation workflow manager may access the object-based data storage service to obtain the application that is to be simulated and optimized based on training of the reinforcement learning model specified by the customer using the custom-designed reinforcement function defined by the customer. Further, the simulation workflow manager may evaluate the various parameters provided by the customer and the system requirements for the various components (e.g., physics engines, rendering engines, robotic device agent, training application, simulation application, etc.) of the simulation to determine what virtual computing instances are to be provisioned in order to support execution of the application in the simulation environment and to generate the simulation environment. For instance, the simulation workflow manager may evaluate the obtained parameters to determine the computational requirements for executing and supporting the simulation. Based on these computational requirements, the simulation workflow manager may provision a set of virtual computing instances within a set of simulation servers to execute the simulation of the application.

In an embodiment, simulation data generated by the virtual computing instances via execution of the simulation is transmitted to a computing resource monitoring service where it is stored and accessed by the robotic device management service. The robotic device management service may obtain 1114 the simulation data from the computing resource monitoring service and store the data in a simulation data repository, where it is made available to customers of the robotic device management service. Thus, the robotic device management service may provide 1116 the simulation data from the simulation data repository and allow the customer to determine the status of the simulation and/or modify the simulation and the application based on the data. It should be noted that providing the simulation data may be performed asynchronously to the request from the customer to perform the simulation. For instance, the simulation data may be stored in a repository, such as the simulation data repository 310 described above in connection with FIG. 3.

Figure 12:
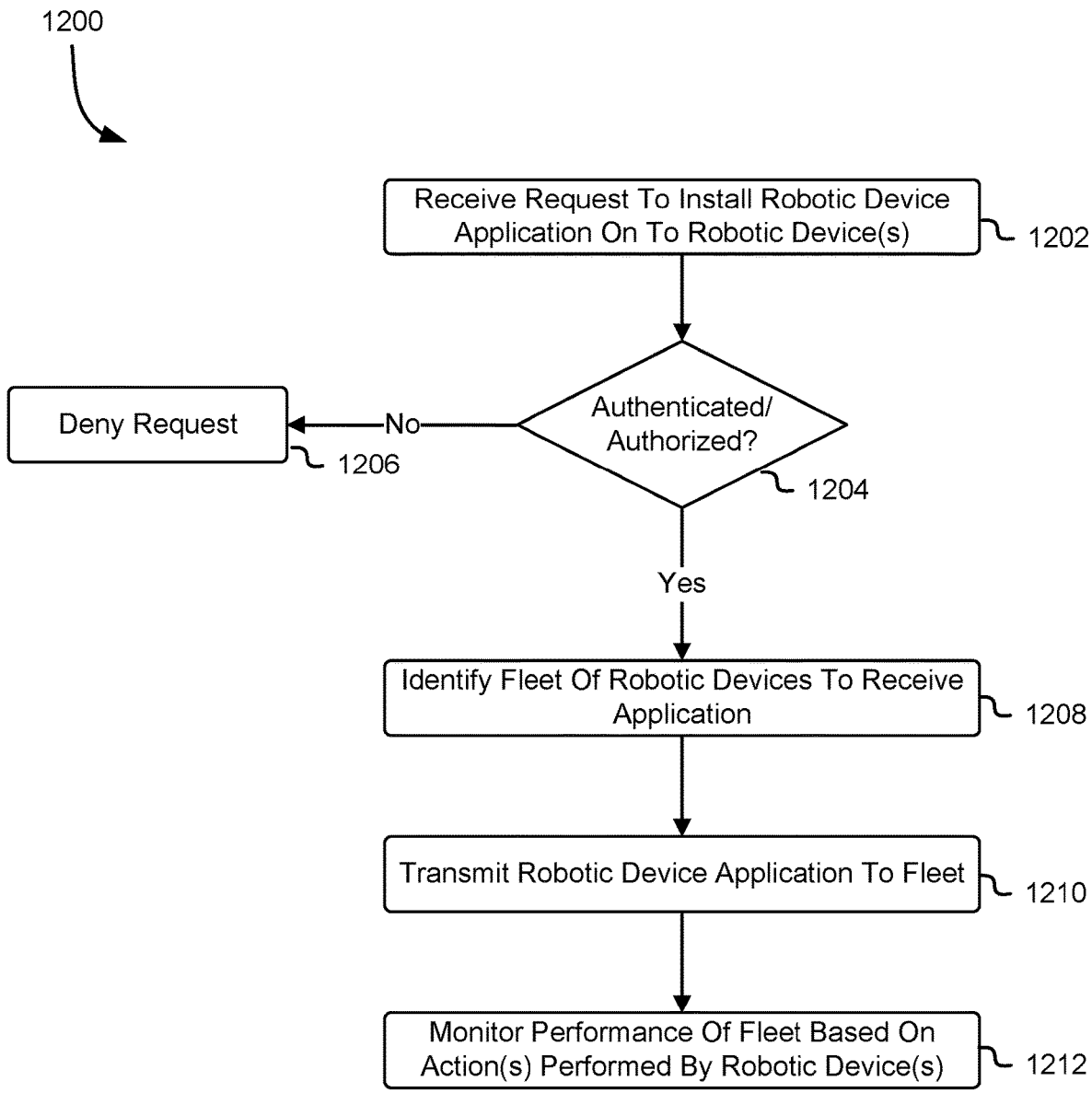
FIG. 12 shows an illustrative example of a process for transmitting a robotic device application to a fleet of robotic devices to cause the fleet of robotic device to install the application and transmit data generated as a result of execution of the application to a client in accordance with at least one embodiment.

FIG. 12 shows an illustrative example of a process 1200 for transmitting a robotic device application to a fleet of robotic devices to cause the fleet of robotic device to install the application and transmit data generated as a result of execution of the application to a client in accordance with at least one embodiment. The process 1200 may be performed by the robotic device management service, which may establish a communications channel with each robotic device designated by the customer to enable the robotic devices to access the robotic device management service and other resources provided through other computing resource services in support of execution of the application. Further, through the communications channel, the robotic device management service may interact with a robotic device to provide the application and monitor performance of the robotic device.

In an embodiment, the robotic device management service receives 1202, from a customer, a request to install a robotic device application on to a set of robotic devices. As noted above, the robotic device management service may provide to the customer, via a client device of the customer, an interface through which the customer may submit the request and define one or more logical groupings of robotic devices that may be used to identify which robotic devices are to obtain and install the robotic device application. In an embodiment, the customer, through the interface, can register a set of robotic devices with the robotic device management service to enable organization of these robotic devices into logical groupings that may be maintained by the robotic device management service. Through the interface, the customer may utilize various API calls to register a new robotic device 112. For example, the customer may submit a unique name for the robotic device that may be used to associate the robotic device with the customer's account. Further, the customer may submit a unique IoT name for the robotic device, which may be used to establish the encrypted communications channel between the robotic device management service and the robotic device. During this registration process, the robotic device management service may require the customer to create a digital certificate for the robotic device in order to allow for authentication of the robotic device in communications with the robotic device management service and any other services of the computing resource service provider, as described above.

In response to the request, the robotic device management service may determine 1204 whether the customer can be authenticated and, if so, whether the customer is authorized to submit such a request. If the customer cannot be authenticated or is otherwise not authorized to submit this request, the robotic device management service may deny 1206 the request. However, if the customer is successfully authenticated and is authorized to submit the request, the robotic device management service may identify 1208 the fleet of robotic devices that are to receive the robotic device application. As noted above, the customer, through the interface, may define which logical groupings of robotic devices are to receive and install the robotic device application. Based on this selection of logical groupings, the robotic device management service may identify the robotic devices that are to receive and install the application. For instance, the robotic device management service may maintain a database that includes an entry for each unique logical grouping identifier. Each entry may specify which robotic devices are part of the logical grouping, including network address information of each robotic device. Thus, the robotic device management service may use this database to identify the set of robotic device that are to receive and install the robotic device application.

The robotic device management service may obtain the robotic device application from a data object within the object-based data storage service. For instance, the request may specify an identifier of the application, which the robotic device management service may use to query a database that includes entries corresponding to network addresses for data objects used to store robotic device applications. From this database, the robotic device management service may identify the network address of the data object that stores the robotic device application corresponding to the provided identifier.

For each robotic device, the robotic device management service may transmit 1210 the robotic device application to the robotic device over a communications channel between the robotic device and the robotic device management service. Alternatively, the robotic device management service may provide the robotic device application to a deployment service that manages deployment of the robotic device application and other data to the robotic devices of the fleet. In an embodiment, this deployment service may monitor the fleet of robotic devices to determine when a robotic device of the fleet is available (e.g., online, transmitting information over the communications channel, etc.). Further, the deployment service may register, through a database, which robotic devices have obtained the application and which robotic devices have reported successful installation of the application.

Through the communications channel, the robotic device may transmit a request, over this communications channel, to the robotic device management service to access a set of resources provided by the service or by other computing resource services. The robotic device may further provide data usable by the customer to visualize the environment that the robotic device is interacting with. For instance, if the robotic device includes a video recording device, the robotic device may use the video recording device to stream video over the communications channel to the robotic device management service. The customer, through the interface provided by the robotic device management service, may access the video stream to watch the robotic device in its environment. Through the communications channel, the customer may interact with the robotic device and issue commands to the robotic device as needed through the interface.

In response to obtaining the robotic device application from the robotic device management service, the robotic devices may each install and execute the robotic device application. In an embodiment, the robotic device management service monitors 1212 performance of each robotic device of the selected logical groupings based on actions performed by each robotic device during execution of the application. For instance, the robotic device management service may determine, based on data obtained from a robotic device, that an issue exists with the application being executed by the robotic device. In an embodiment, if the robotic device management service determines that there is an issue with the application being executed on a robotic device, the robotic device management service provides an earlier version of the application from the data object to the robotic device for installation and execution. The robotic device management service may maintain, in the data object maintained by the object-based data storage service, earlier versions of the application in the event that the latest version of the application, updated based on simulations performed using the application, is found to have issues impacting performance of the robotic devices. Thus, the robotic device management service may allow the robotic devices to execute the earlier version of the application.

In an embodiment, the customer can request suspension or termination of deployment of the robotic device application to the robotic devices of the fleet based on data generated through monitoring of the performance of robotic devices that have obtained and executed the application. For instance, during deployment of the robotic device application, if the robotic device management service identifies an issue with the application resulting from execution of the application by the robotic devices that have obtained the application, the robotic device management service may transmit information detailing the detected issue to the customer. Using this information, the customer may determine whether to suspend or terminate the deployment of the application to the remaining designated robotic devices of the fleet. Alternatively, the robotic device management service may automatically suspend or terminate deployment of the application to the remaining robotic devices of the fleet and await a response from the customer as to whether to continue with deployment of the application.

Figure 13:
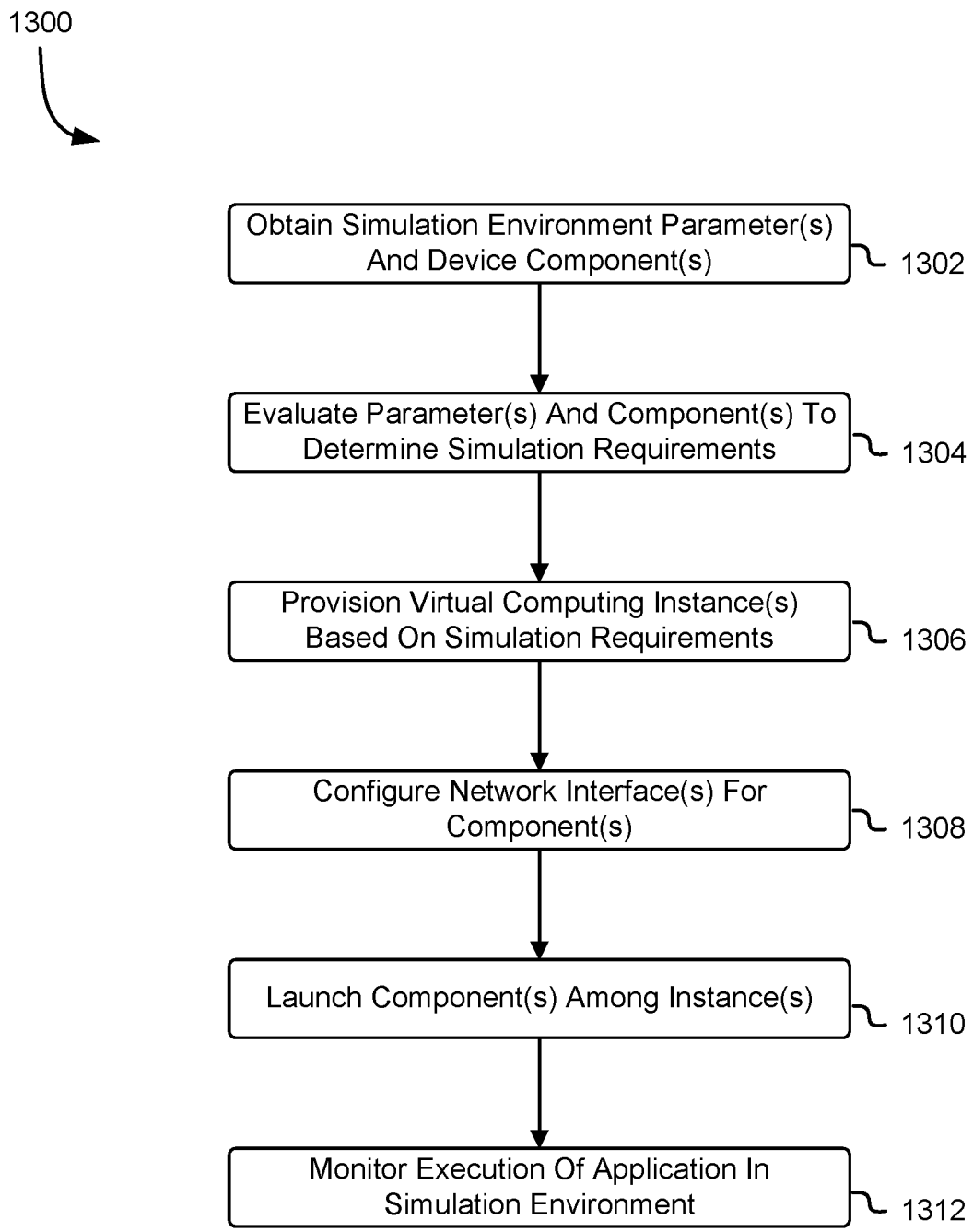
FIG. 13 shows an illustrative example of a process for provisioning virtual computing instances based on simulation requirements for a robotic device application to initiate execution of the simulation in accordance with at least one embodiment.

FIG. 13 shows an illustrative example of a process 1300 for provisioning virtual computing instances based on simulation requirements for a robotic device application to initiate execution of the simulation in accordance with at least one embodiment. The process 1300 may be performed by a simulation workflow manager provisioned by the robotic device management service within a virtual computing instance management service or other service that enable provisioning and use of virtual computing instances for simulation of robotic device applications.

The robotic device management service may transmit a request to a simulation workflow manager of the virtual computer system management service to configure the simulation of the application. The request may include the set of parameters defined by the customer through the service frontend for the simulation. Further, the request may include the set of credentials from the credential management subsystem and the network address corresponding to the data object in the object-based data storage service where the application is stored and where the reinforcement learning model is to be stored once the simulation has been completed. Thus, through the request, the simulation workflow manager may obtain 1302 the simulation environment parameters and the robotic device parameters.

In response to the request, the simulation workflow manager may interact with the credential management sub-system to validate the obtained set of credentials from the simulation control sub-system. If the set of credentials are valid, the simulation workflow manager may initiate configuration of the simulation of the application. The simulation workflow manager may access the object-based data storage service to obtain the application that is to be simulated and optimized based on training of the reinforcement learning model specified by the customer using the custom-designed reinforcement function defined by the customer via the robotic device management service. Further, the simulation workflow manager may evaluate 1304 the various parameters provided by the customer via the robotic device management service and the system requirements for the various components (e.g., physics engines, rendering engines, robotic device agent, training application, simulation application, etc.) of the simulation to determine what virtual computing instances are to be provisioned in order to support execution of the application in the simulation environment and to generate the simulation environment. For instance, the simulation workflow manager may evaluate the obtained parameters to determine the computational requirements for executing and supporting the simulation. For example, the simulation workflow manager may identify a set of components of the simulation needed to execute the simulation and to process actions of the robotic device within the simulation environment. Based on these computational requirements, the simulation workflow manager may provision 1306 a set of virtual computing instances within a set of simulation servers to execute the simulation of the application. In an embodiment, if the customer provides an update to the application, whereby the parameters and components may be similar to those defined for a previous version of the application, the simulation workflow manager can utilize the same virtual computing instances used to perform the simulation of the previous version of the application to perform the simulation of the updated application. This may obviate the need to provision the virtual computing instances based on the simulation requirements, as the previously used virtual computing instances may be utilized for the updated application.

In an embodiment, the simulation workflow manager allocates the various components of the simulation among different virtual computing instances on the simulation servers based on the system requirements of the components and the capabilities of the virtual computing instances. For example, the simulation workflow manager may create, from the set of components, discretizable subsets of the simulation that may be apportioned among the virtual computing instances. The simulation workflow manager may place a first set of components corresponding to a subset of the simulation within a virtual computing instance. If there is remaining capacity for additional components in the virtual computing instance, the simulation workflow manager may allocate the next set of components within the same virtual computing instance. Otherwise, the simulation workflow manager may allocate the next subset of the simulation on to another virtual computing instance. The simulation workflow manager may continue this process until all components of the simulation have been allocated among the various virtual computing instances within the simulation servers. In an embodiment, if the simulation workflow manager determines that particular components are required to be collocated on the same simulation server, the simulation workflow manager identifies the virtual computing instances available on a particular simulation server and allocates the components among the virtual computing instances on the particular simulation server.

In an embodiment, the simulation workflow manager configures 1308, between each virtual computing instance utilized for the simulation, a network interface to enable secure communications among the various components of the simulation. The simulation workflow manager may map the simulation to the customer's own virtual private network and/or to a customer's own virtual computing instances operating within an on-premises network. This ensures that resources necessary for execution of the simulation are available to the components executing the application within the simulation environment. Once the network interfaces have been established, the simulation workflow manager may launch 1310 the components among the various virtual computing instances to initiate the simulation. Further, the simulation workflow manager may monitor 1312 the virtual computing instances executing the simulation and the simulation servers to ensure that the simulation is completed successfully.

Figure 14:
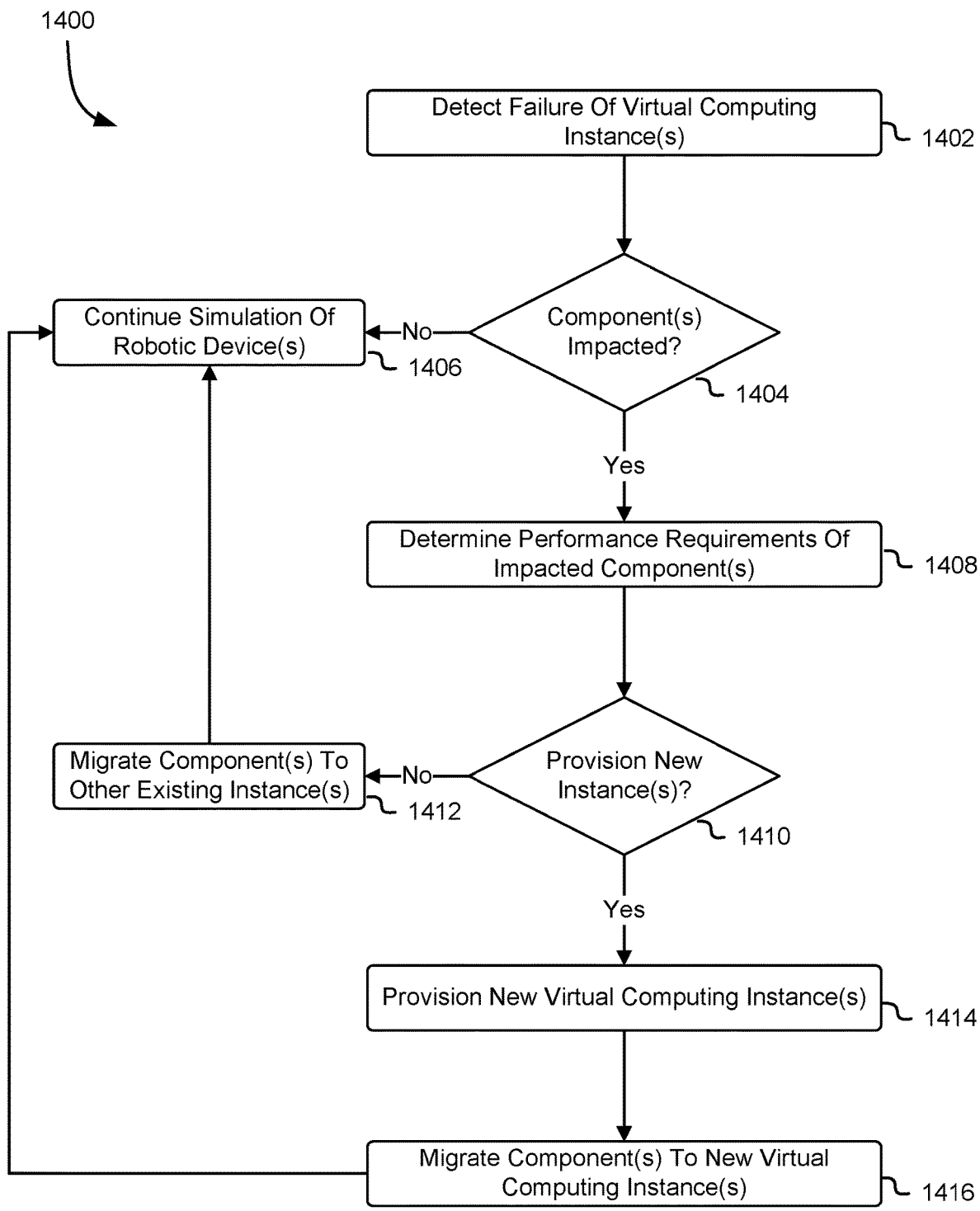
FIG. 14 shows an illustrative example of a process for migrating robotic device components to other virtual computing instances in response to detecting a failure of a set of existing virtual computing instances in accordance with at least one embodiment.

If the simulation workflow manager detects that a virtual computing instance has failed or is otherwise inoperative, the simulation workflow manager may identify the components impacted by the failure and provision new virtual computing instances to accommodate the impacted components. This may ensure that simulation of a robotic device application is minimally impacted by the failure. Accordingly, FIG. 14 shows an illustrative example of a process 1400 for migrating robotic device components to other virtual computing instances in response to detecting a failure of a set of existing virtual computing instances in accordance with at least one embodiment. The process 1400 may be performed by the aforementioned simulation workflow manager of the virtual computing instance management service.

As noted above, the simulation workflow manager may monitor the virtual computing instances utilized for execution of the simulation to identify any issues that may impact performance of the simulation. For instance, the simulation workflow manager may obtain, from each virtual computing instance, metrics data usable to gauge the performance of the virtual computing instance. Using this data, the simulation workflow manager may detect 1402 failure of one or more virtual computing instances utilized to perform a simulation of a robotic device application. In an embodiment, if the simulation workflow manager determines that a virtual computing instance has failed, or is otherwise inoperative, the simulation workflow manager can determine 1404 whether any components of the simulation are impacted by the failure. If the simulation workflow manager determines that no components of the simulation are impacted as a result of the detected failure, the simulation workflow manager may continue 1406 simulation of the robotic device application.

If the simulation workflow manager determines that one or more components are impacted as a result of the detected failure, the simulation workflow manager may determine 1408 the system requirements for each of the impacted components and determine 1410, based on these system requirements, whether new virtual computing instances need to be provisioned in order to accommodate these impacted components. If new virtual computing instances are not required, the simulation workflow manager may migrate 1412 the impacted components among the existing, operating virtual computing instances and continue 1406 simulation of the robotic device application. However, if the existing set of virtual computing instances are unable to accommodate the impacted components of the simulation, the simulation workflow manager may provision 1414 new virtual computing instances among the simulation servers to accommodate these impacted components of the simulation. The simulation workflow manager may migrate 1416 the impacted components to the new virtual computing instances and continue 1406 simulation of the application.

Figure 15:
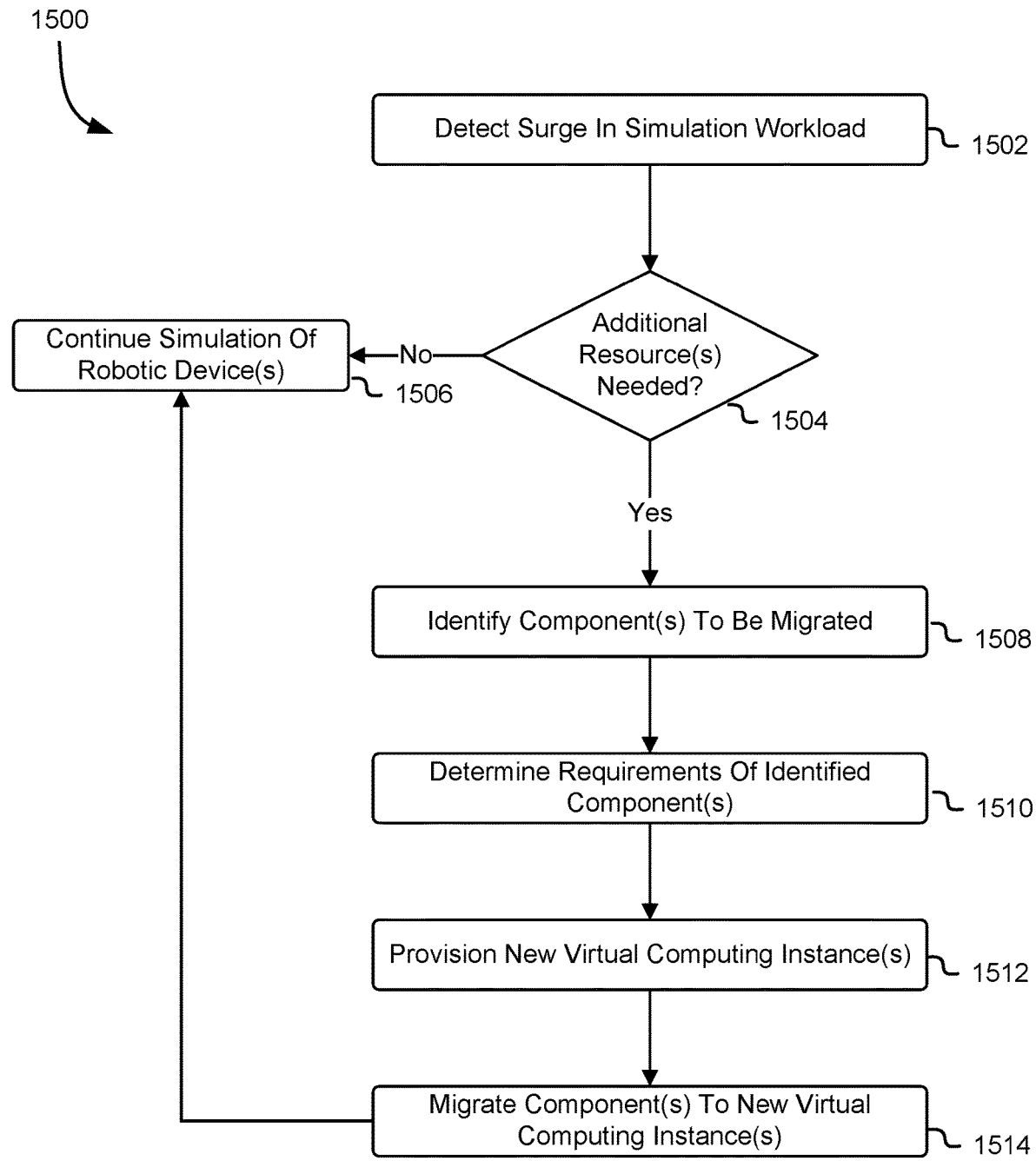
FIG. 15 shows an illustrative example of a process for provisioning additional virtual computing instances in response to detecting a surge in the simulation workload for a particular simulation in accordance with at least one embodiment.

Similarly, if the simulation workflow manager may monitor the virtual computing instances to detect a surge in the workload of the components of the simulation. If there is a surge in the workload of the components of the simulation, the simulation workflow manager may identify the components impacted by this surge in workload and provision new virtual computing instances to accommodate the impacted components. This may ensure that simulation of a robotic device application is minimally impacted by the surge in workload. Accordingly, FIG. 15 shows an illustrative example of a process 1500 for provisioning additional virtual computing instances in response to detecting a surge in the simulation workload for a particular simulation in accordance with at least one embodiment. The process 1500 may be performed by the aforementioned simulation workflow manager.

The simulation workflow manager may monitor the virtual computing instances utilized for execution of the simulation to identify any issues that may impact performance of the simulation. For instance, the simulation workflow manager may obtain, from each virtual computing instance, metrics data usable to gauge the performance of the virtual computing instance. Using this data, the simulation workflow manager may detect 1502 a surge in the simulation workload of one or more virtual computing instances utilized to perform a simulation of a robotic device application. The simulation workflow manager may determine 1504 whether this surge in the workload of the components of the simulation requires additional resources to ensure that the simulation is completed successfully without negatively impacting the latency between the components of the simulation.

If the surge in the workload of the components of the simulation results in a determination that no additional resources are required to ensure successful completion of the simulation, the simulation workload manager may continue 1506 simulation of the robotic device application. However, if additional resources are needed, the simulation workflow manager may identify 1508 which components need to be migrated to new virtual computing instances to ensure successful completion of the simulation. The simulation workflow manager may determine 1510 the system requirements of these components and, based on these system requirements, provision 1512 new virtual computing instances capable of accommodating these components. For instance, the simulation workflow manager may monitor the resource usage of each component to identify, in the event of a surge in workload, which components are the source of the surge in workload. If a surge in workload is detected, the simulation workflow manager may determine which components are eligible for migration (e.g., evaluate collocation requirements for components, evaluate system and location requirements for components, etc.) and, from those components eligible for migration, determine the resource utilization for each of these components. Based on the resource utilization for each of the eligible components, the simulation workflow manager may select one or more components for migration. As an illustrative example, if the CPU usage for the simulation exceeds a maximum threshold value, the simulation workflow manager may identify the component with the greatest CPU utilization rate and determine whether migrating the component to a new virtual computing instance would reduce its CPU utilization rate. If not, the simulation workflow manager may select the next component with the highest CPU utilization rate and repeat the process until one or more components are identified for migration.

The simulation workflow manager may migrate 1514 the identified components to the new virtual computing instances and continue 1506 simulation of the application. For instance, the simulation workflow manager may transmit computer-executable code of each of the identified components to the new virtual computing instances to enable execution of these components within the virtual computing instances. Further, the simulation workflow manager may establish, among the new virtual computing instances, network interfaces to enable the migrated components to communicate with the other components of the simulation within a virtual private network, as described above.

In an embodiment, the simulation workflow manager may also determine, based on the simulation workload of the various components, whether the simulation may be performed using fewer resources than provisioned for execution of the simulation. For instance, if the simulation workflow manager determines, based on the simulation workload for each of the components, that fewer resources may be used to perform the simulation, the simulation workload manager may condense the components into a smaller set of virtual computing instances. Thus, the simulation workload manager may identify a set of virtual computing instances that may accommodate the components and migrate the components onto this smaller set of virtual computing instances to scale down the resources utilized to perform the simulation.

Figure 16:
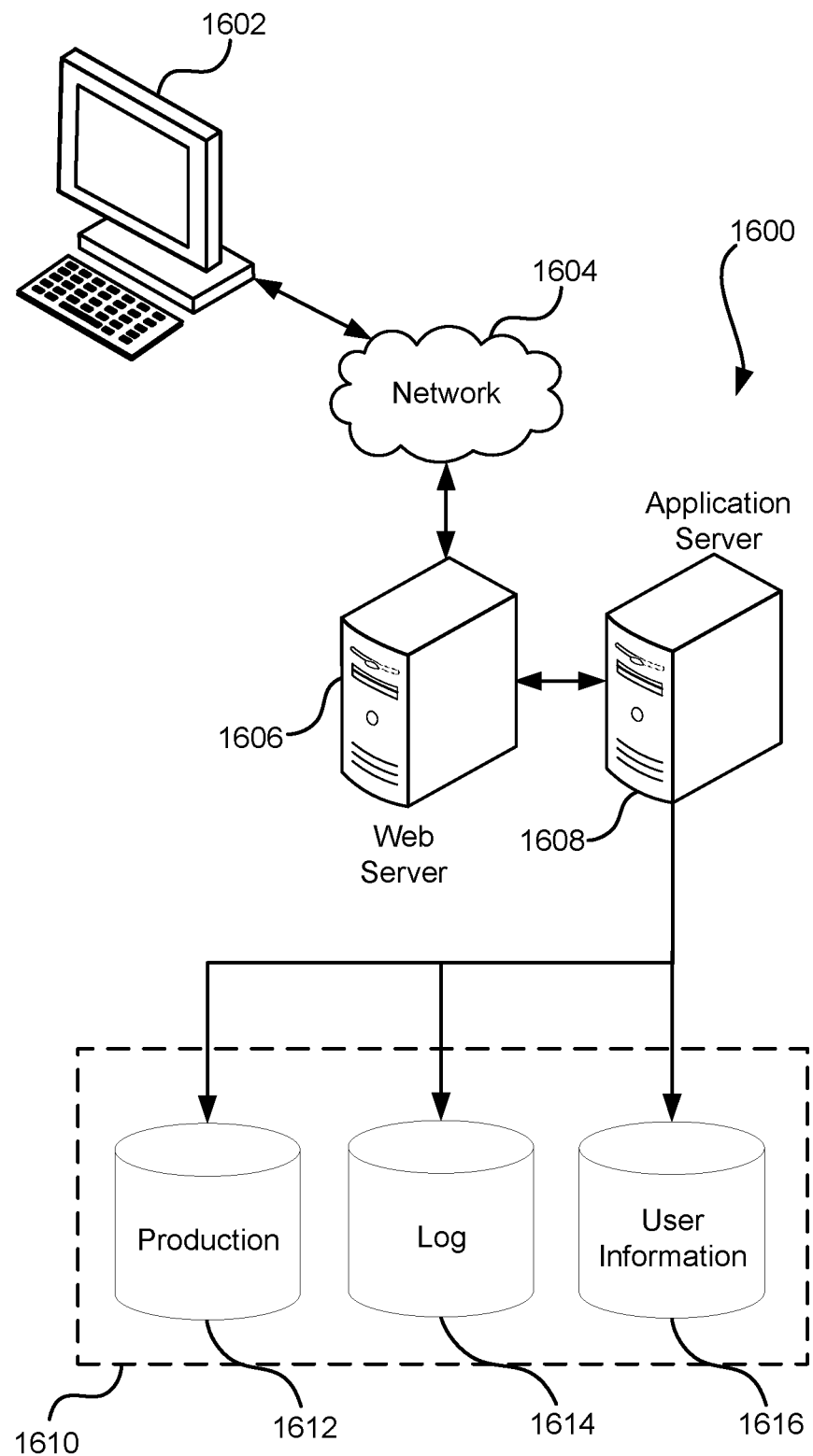
FIG. 16 shows an illustrative example of a system in which various embodiments can be implemented.

FIG. 16 illustrates aspects of an example system 1600 for implementing aspects in accordance with an embodiment. As will be appreciated, although a web-based system is used for purposes of explanation, different systems may be used, as appropriate, to implement various embodiments. In an embodiment, the system includes an electronic client device 1602, which includes any appropriate device operable to send and/or receive requests, messages, or information over an appropriate network 1604 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1606 for receiving requests and serving content in response thereto, although for other networks an alternative device serving a similar purpose could be used as would be apparent to one of ordinary skill in the art.

In an embodiment, the illustrative system includes at least one application server 1608 and a data store 1610, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1602 and the application server 1608, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1610, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1612 and user information 1616, which are used to serve content for the production side. The data store also is shown to include a mechanism for storing log data 1614, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1610.

The data store 1610, in an embodiment, is operable, through logic associated therewith, to receive instructions from the application server 1608 and obtain, update or otherwise process data in response thereto, and the application server 1608 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1602. Continuing with example, information for a particular item of interest is viewed in a dedicated page or window of the browser. It should be noted, however, that embodiments of the present disclosure are not necessarily limited to the context of web pages but are more generally applicable to processing requests in general, where the requests are not necessarily requests for content. Example requests include requests to manage and/or interact with computing resources hosted by the system 1600 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1600, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 16. Thus, the depiction of the system 1600 in FIG. 16 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
obtaining, at a service provider network, a first set of parameters of a robotic device associated with a customer account and a second set of parameters specifying a reinforcement learning model, wherein the reinforcement learning model comprises a customer-defined reinforcement function;
generating, in response to a first request to simulate execution of an application comprising the reinforcement learning model for the robotic device, a simulation environment;
provisioning computing resources determined to be sufficient to execute the simulation environment and train the reinforcement learning model, wherein sufficiency of the computing resources is determined based, at least in part, on the second set of parameters specifying the reinforcement learning model;
executing, in the simulation environment using the provisioned computing resources, the application for the robotic device to obtain data indicating simulated performance of the application;
updating the reinforcement learning model based at least in part on the simulated performance and a customer-supplied update to the customer-defined reinforcement function during the simulated performance;
providing the data and the updated reinforcement learning model to fulfill the first request;
obtaining a second request to install the application comprising the updated reinforcement learning model on to a fleet of robotic devices associated with the customer account, the fleet including the robotic device;
transmitting the application from the service provider network to the fleet of robotic devices associated with the customer account that includes the robotic device;
monitoring performance of the fleet of robotic devices in a physical environment resulting from the execution of the application in the physical environment; and
updating the reinforcement learning model based at least in part on the monitored performance in the physical environment.

2. The computer-implemented method of claim 1, wherein the method further comprises:
obtaining sensor data corresponding to responses of the robotic device to the physical environment;
updating, based on the sensor data, the application resulting in an updated application; and
transmitting, to the fleet of robotic devices, the updated application.

3. The computer-implemented method of claim 1, wherein the method further comprises:
establishing a communications channel to the service provider network, through the application, with the robotic device;
transmitting, over the communications channel, executable instructions to cause the robotic device to perform a set of actions; and
obtaining, over the communications channel, additional data from the robotic device, the additional data specifying responses to execution of the executable instructions.

4. The computer-implemented method of claim 1, wherein the provisioning further comprises:
establishing a virtual private network connected to a customer component; and
performing parallel simulations, in the simulation environment, of the application using the computing resources and the customer component.

5. The computer-implemented method of claim 1, further comprising:
detecting, from the simulated performance, a termination condition comprising one or more of a completed simulation or a fault in the execution of the application during a simulation; and
updating, in response to the detecting, the application by modifying at least one parameter of the first set of parameters, at least one parameter of the second set of parameters, or the reinforcement learning model according to the termination condition.

6. A system, comprising:
one or more processors; and
memory that stores computer-executable instructions that, if executed, cause the one or more processors to:
obtain a first set of parameters of a robotic device associated with a customer account and a second set of parameters specifying a simulation environment for testing an application of the robotic device, the first set of parameters indicating a data storage location of the application and the customer account and the second set of parameters indicating a selection of the simulation environment from a set of simulation environments;
obtain a reinforcement learning model for the application and a termination condition for completing training of the reinforcement learning model, wherein the reinforcement learning model comprises a customer-defined reinforcement function;
select, from a pool of resources, a set of resources on which to execute a set of simulations in the simulation environment, the set of resources selected based, at least in part, on sufficiency of the set of resources for executing the set of simulations and training the reinforcement learning model;
obtain the application from the data storage location;
load the application onto the set of resources;
execute the set of simulations with the application to train the reinforcement learning model until the termination condition is reached;
monitor execution of the set of simulations to obtain data indicative of performance of the application; and
provide the data to enable modification of the application and the reinforcement learning model during the execution of the set of simulations, wherein:
the modification of the reinforcement learning model comprises receiving, from a customer, an updated customer-defined reinforcement function, and
the modification of the application is based on at least one of the performance of the application, the updated customer-defined reinforcement function, and the termination condition.

7. The system of claim 6, wherein the computer-executable instructions further cause the one or more processors to:
identify, based on the first set of parameters and the second set of parameters, a number of simulations to be performed for testing of the application in the simulation environment; and
select, based on the number of simulations to be performed, the set of resources on which to execute the set of simulations.

8. The system of claim 6, wherein the computer-executable instructions further cause the one or more processors to transmit, to a fleet of robotic devices, associated with the customer account, that includes the robotic device, the application to cause the fleet of robotic devices to install and execute the application.

9. The system of claim 8, wherein the computer-executable instructions further cause the one or more processors to:
detect an issue with the application that prevents further execution of the application on the fleet of robotic devices;
identify a different version of the application; and
transmit, to the fleet of robotic devices, the different version of the application to cause the fleet of robotic devices to install and execute the different version of the application.

10. The system of claim 8, wherein the computer-executable instructions further cause the one or more processors to:
establish a communications channel with the robotic device;
obtain a set of executable instructions that, if executed by the robotic device, cause the robotic device to perform a set of operations; and
transmit, over the communications channel, the set of executable instructions.

11. The system of claim 10, wherein the computer-executable instructions further cause the one or more processors to:
obtain, from the robotic device over the communications channel, a request to access a second set of resources, the request including a digital certificate of the robotic device;
authenticate, based on the digital certificate, the robotic device; and
provide access to the second set of resources in accordance with access control policies associated with the digital certificate.

12. The system of claim 6, wherein the computer-executable instructions further cause the one or more processors to:
determine, prior to the termination condition being reached, that additional resources are required to support continued execution of the simulation in the simulation environment; and
provision the additional resources to enable the continued execution of the simulation.

13. A non-transitory computer-readable storage medium comprising executable instructions that, as a result of being executed by one or more processors of a computer system, cause the computer system to at least:
obtain a first set of parameters of a robotic device associated with a customer account and a second set of parameters specifying a simulation environment for testing an application of the robotic device;
obtain a set of reinforcement learning models, wherein a reinforcement learning model of the set of reinforcement learning models comprises a customer-defined reinforcement function;
select, from a pool of computer system instances, a set of computer system instances on which to execute a set of simulations in the simulation environment, the set of computing system instances determined to be sufficient for executing the set of simulations and training the set of reinforcement learning models;
execute the set of simulations in the simulation environment, each simulation simulating a reinforcement learning model of the set of reinforcement learning models;
obtain a selection from the set of reinforcement learning models indicating a selected reinforcement learning model;
update the application based on the selected reinforcement learning model;
select a fleet of robotic devices from a set of robotic devices associated with the customer account;
transmit, to the fleet of robotic devices, associated with the customer account, that includes the robotic device, a resource identifier indicating a location of the application data to cause the fleet of robotic devices to install and execute the application;
obtain, from the robotic device, data generated in response to sensor inputs obtained by the robotic device; and
update, using the data, a graphical user interface to enable monitoring of the robotic device and updating of the customer-defined reinforcement function with a customer-defined update during execution of the application.

14. The non-transitory computer-readable storage medium of claim 13, wherein the instructions that cause the computer system to execute the set of simulations in the simulation environment further cause the computer system to:
determine, based on the first set of parameters and the second set of parameters, a number of simulations to be performed;
identify, for each simulation of the number of simulations, a number of computer system instances for execution of the simulation; and
based on the number of computer system instances for execution of each simulation of the number of simulations, identify the set of computer system instances.

15. The non-transitory computer-readable storage medium of claim 13, wherein the instructions further cause the computer system to:
obtain an indication, from a subset of the fleet of robotic devices, that an error impacting execution of the application has been detected by the subset of the fleet of robotic devices; and
in response to the indication, transmit second application data corresponding to a different version of the application to the subset of the fleet of robotic devices to cause the subset of the fleet of robotic devices to install and execute the different version of the application.

16. The non-transitory computer-readable storage medium of claim 13, wherein the instructions further cause the computer system to:
obtain, from the robotic device, a request to access a set of resources, the request including a digital certificate of the robotic device;
evaluate the digital certificate of the robotic device to identify a set of access control policies specifying a level of access to the set of resources; and
allow the robotic device to access the set of resources subject to the set of access control policies.

17. The non-transitory computer-readable storage medium of claim 13, wherein the instructions further cause the computer system to:
- obtain, via the graphical user interface, computer-executable instructions that, if executed by the robotic device, cause the robotic device to perform a set of operations;
- transmit the computer-executable instructions to the robotic device; and
- monitor execution of the computer-executable instructions using additional data generated in response to second sensor inputs obtained by the robotic device as a result of the execution of the computer-executable instructions.

18. The non-transitory computer-readable storage medium of claim 13, wherein the instructions further cause the computer system to:
- monitor execution of the set of simulations in the simulation environment;
- determine that additional computer system instances are needed to enable continued execution of the set of simulations; and
- provision, from the pool of computer system instances, the additional computer system instances to allow the continued execution of the set of simulations.

19. The non-transitory computer-readable storage medium of claim 13, wherein the instructions that cause the computer system to execute the set of simulations in the simulation environment further cause the computer system to utilize the set of reinforcement learning models based on simulated performance of a simulated robotic device within the simulation environment, the instructions further causing the system to:
- generate a ranking of the set of reinforcement learning models utilized in the simulation environment; and
- present the ranking of the set of reinforcement learning models, wherein the ranking provides information usable, by a customer, for updating the customer-defined reinforcement function and defining a new customer-defined reinforcement function during the set of simulations.

20. The non-transitory computer-readable storage medium of claim 19, wherein the instructions further cause the computer system to:
- detect, from the simulated performance, a termination condition comprising one or more of a completed simulation or a fault in the execution of the application during a simulation; and
- update, in response to the detecting, the application by modifying at least one parameter of the first set of parameters, at least one parameter of the second set of parameters, or the reinforcement learning model according to the termination condition.

* * * * *